United States Patent
Koseki et al.

(10) Patent No.: US 10,459,639 B2
(45) Date of Patent: Oct. 29, 2019

(54) STORAGE UNIT AND STORAGE SYSTEM THAT SUPPRESS PERFORMANCE DEGRADATION OF THE STORAGE UNIT

(71) Applicant: HITACHI, LTD., Tokyo (JP)

(72) Inventors: Hideyuki Koseki, Tokyo (JP); Shigeo Homma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 145 days.

(21) Appl. No.: 15/545,743

(22) PCT Filed: Apr. 28, 2015

(86) PCT No.: PCT/JP2015/062791
§ 371 (c)(1),
(2) Date: Jul. 24, 2017

(87) PCT Pub. No.: WO2016/174729
PCT Pub. Date: Nov. 3, 2016

(65) Prior Publication Data
US 2018/0011642 A1   Jan. 11, 2018

(51) Int. Cl.
G06F 11/00 (2006.01)
G06F 3/06 (2006.01)
G06F 11/10 (2006.01)

(52) U.S. Cl.
CPC ............ *G06F 3/0616* (2013.01); *G06F 3/067* (2013.01); *G06F 3/0649* (2013.01);
(Continued)

(58) Field of Classification Search
CPC ........ G06F 3/0616; G06F 3/06; G06F 3/0649; G06F 3/0688; G06F 11/1076
See application file for complete search history.

(56) References Cited

U.S. PATENT DOCUMENTS 6,445,627 B1 * 9/2002 Nakahara ............. G11C 29/028
365/200
6,516,380 B2 * 2/2003 Kenchammana-Hoskote ............
G06F 12/0804
711/113

(Continued)

FOREIGN PATENT DOCUMENTS

WO    2008-040713 A     2/2008
WO    2009/130848 A1    10/2009
WO    2014/196000 A1    12/2014

OTHER PUBLICATIONS

International Search Report, PCT/JP2015/062791, dated Aug. 4, 2015, 1 pg.

*Primary Examiner* — Esaw T Abraham
(74) *Attorney, Agent, or Firm* — Volpe and Koenig, P.C.

(57) ABSTRACT

A storage unit according to one aspect of the present invention comprises a storage controller and a plurality of storage devices. Each storage device has nonvolatile semiconductor memories serving as storage media. The controller of each storage device diagnoses the state of degradation of the nonvolatile semiconductor memories, and if one of the nonvolatile semiconductor memories is expected to be nearing end of life, then the controller copies the data stored in that degraded nonvolatile semiconductor memory to another nonvolatile semiconductor memory, and then performs shutdown processing for the degraded nonvolatile semiconductor memory, as well as storage capacity reduction processing.

13 Claims, 28 Drawing Sheets

(52) U.S. Cl.
CPC .......... *G06F 3/0665* (2013.01); *G06F 3/0688* (2013.01); *G06F 11/1076* (2013.01)

(56) References Cited

U.S. PATENT DOCUMENTS

| | | | | |
|---|---|---|---|---|
| 6,609,177 | B1 * | 8/2003 | Schlumberger | G06F 12/0888 |
| | | | | 711/119 |
| 6,865,650 | B1 * | 3/2005 | Morley | G06F 11/1076 |
| | | | | 711/112 |
| 7,283,816 | B2 * | 10/2007 | Fok | H04L 43/00 |
| | | | | 455/418 |
| 7,577,783 | B2 * | 8/2009 | Hsu | G11C 29/88 |
| | | | | 365/200 |
| 9,122,585 | B2 * | 9/2015 | Shim | G06F 12/0246 |
| 9,223,695 | B2 * | 12/2015 | Makuni | G06F 12/0246 |
| 9,323,659 | B2 * | 4/2016 | Shats | G06F 12/0246 |
| 9,443,591 | B2 * | 9/2016 | Baryudin | G06F 3/0605 |
| 2008/0034156 | A1 | 2/2008 | Kawaguchi et al. | |
| 2009/0271564 | A1 | 10/2009 | Sugimoto et al. | |
| 2016/0004615 | A1 | 1/2016 | Uehara et al. | |

\* cited by examiner

FIG. 8

Virtual volume management table ~500

| Virtual volume # 501 | Pool # 502 | Virtual volume LBA range 503 | Virtual chunk number 504 | RAID group number 505 | Chunk number 506 |
|---|---|---|---|---|---|
| 0 | 1 | 0x0000~0x04FF | 1 | 1 | 1 |
|   |   | 0x0500~0x09FF | 2 | 1 | 2 |
|   |   | 0x0A00~0x0EFF | 3 | 2 | 2 |
|   |   | 0x0F00~0x0FFF | 4 | NULL | NULL |
| 1 |   | 0x0000~0x04FF | 1 | 2 | 1 |
|   |   | 0x0500~0x09FF | 2 | 2 | 3 |
| ⋮ | ⋮ | ⋮ | ⋮ | ⋮ | ⋮ |
| N |   |   |   |   |   |

Pool management table ~550

| Pool # ~551 | RG# ~552 | Chunk # ~553 | RAID group LBA ~554 | Status ~555 | Remaining capacity of pool ~556 |
|---|---|---|---|---|---|
| 1 | 1 | 1 | 0x0000~0x00FF | Allocated | 1000GB |
|   |   | 2 | 0x0100~0x0100 | Allocated |   |
|   |   | 3 | 0x0200~0x02FF | Unallocated |   |
|   |   | ⋮ | ⋮ | ⋮ |   |
|   | 4 | n |   | Non-allocatable |   |
|   | 2 | 1 | 0x0000~0x00FF | Allocated |   |
|   |   | 2 | 0x0100~0x0100 | Allocated |   |
|   |   | ⋮ | ⋮ | ⋮ |   |
| ⋮ |   |   |   |   | ⋮ |

FIG. 10

RAID group management table 650

| RG # | Drive number 652 | RAID group LBA 653 | RAID level 654 | Drive capacity 655 | RAID group remaining capacity 656 |
|---|---|---|---|---|---|
| 1 | SSD#0 | 0x0000,... | RAID5 | 1PB | 600GB |
|   | SSD#1 | 0x0010,... |  | 1PB |  |
|   | SSD#2 | 0x0020,... |  | 1PB |  |
|   | SSD#3 | 0x0040,... |  | 1PB |  |
| 2 | SSD#4 | 0x0000,... | RAID6 | 6PB |  |
|   | SSD#5 | 0x0010,... |  | 7PB |  |
|   | SSD#6 | 0x0020,... |  | 10PB |  |
|   | SSD#7 | 0x0040,... |  | 12PB |  |
| ... | ... | ... |  | ... | ... |
| N |  |  |  |  |  |

FIG.12

| Configuration information management table 1300 | | | | |
|---|---|---|---|---|
| Total physical capacity 1301 | Logical capacity 1302 | Reserve capacity 1303 | Blocked capacity 1304 | Minimum reserve capacity 1305 |
| 3.0TB | 1.6TB | 1.0TB | 0.4TB | 0.1TB |

FIG.13

Logical-physical conversion table 1100

| SSD LBA 1101 | Logical page # 1102 | Status 1103 | Block # 1104 | Physical page # 1105 |
|---|---|---|---|---|
| 0x0000 | 0 | Allocated | 2 | 0 |
| 0x0500 | 1 | Allocated | 0 | 0 |
| 0x0A00 | 2 | Unallocated | NULL | NULL |
| 0x0E00 | 3 | Allocated | 0 | 1 |
| ... | ... | ... | ... | ... |
| 0x9B00 | K-1 | Unallocated | NULL | NULL |
| 0xA000 | K | Unallocated | NULL | NULL |
| ... | ... | ... | ... | ... |

FIG.14

Block management table

| Block # | Physical page # | Status | Error bit count | WR time | Elapsed time after WR | Erase count |
|---|---|---|---|---|---|---|
| 0 | 0 | Allocated | 40 | 2013/1/1 0:00 | 8769 | 3000 |
| | 1 | Allocated | 1000 | 2013/1/2 0:00 | 6789 | |
| | 2 | Unallocated | 50 | 2013/1/2 4:51 | 4321 | |
| | 3 | Unused | 0 | 0 | 0 | |
| | ... | ... | ... | ... | ... | |
| 1 | 0 | Blockade (reservation) | 4000 | 2013/1/1 3:00 | 6543 | 4532 |
| | ... | Blockade (reservation) | 2000 | 2013/1/1 4:00 | 5432 | |
| 2 | 0 | Blockade | N/A | N/A | N/A | 2123 |
| | 1 | Blockade | N/A | N/A | N/A | |
| | ... | ... | ... | ... | ... | |
| ... | | | | | | ... |

FIG.17

FM error characteristic table 1200

| Block erase count 1201 | Sample # 1202 | Error bit count 1204 | | |
|---|---|---|---|---|
| | | Elapsed time after WR 0 or greater and smaller than 1 — 1203 | Elapsed time after WR 1 or greater and smaller than k | Elapsed time after WR k or greater ... — 1205 |
| 0 | 1 (high quality) | 1 | 7 | 10 |
| | 2 | 10 | 60 | 70 |
| | 3 | 120 | 150 | 180 |
| | ⋮ | ⋮ | ⋮ | ⋮ |
| | N (low quality) | | | |
| 1 | 1 (high quality) | 1 | 10 | 30 |
| | 2 | 10 | 70 | 100 |
| | 3 | 120 | 200 | 380 |
| | ⋮ | ⋮ | ⋮ | ⋮ |
| | N (low quality) | | | |
| ⋮ | | | | |

FM life characteristic table ~1400

| Sample # | Erase count 1402 | |
|---|---|---|
| | Life determination threshold | Blockade determination threshold 1403 |
| 1 | 3000 | 2900 |
| 2 | 2000 | 1900 |
| 3 | 1000 | 900 |
| ... | ... | ... |
| N | | |

STORAGE UNIT AND STORAGE SYSTEM THAT SUPPRESS PERFORMANCE DEGRADATION OF THE STORAGE UNIT

TECHNICAL FIELD

The present invention relates to controlling a storage unit.

BACKGROUND ART

Storage units are equipped with a large number of storage devices for storing data, and a storage controller for controlling the storage devices, and the object thereof is to provide a large capacity of data storage space to a computer.

Heretofore, HDDs (Hard Disk Drives) are installed as storage devices, but recently, storage devices (such as SSDs: Solid State Drives) having nonvolatile semiconductor memories (such as FMs: Flash Memories) are attracting attention as new storage media that can be used in replacement of HDDs.

Generally, many SSDs are equipped with a plurality of NAND type FM chips, and the FM chips perform reading and writing of data in units called pages. Since the FM cannot directly overwrite the data stored in a page, data must be erased once to store new data. Erasing of data is executed to a group of pages called a block. Further, a group of blocks called a die is constructed within the FM. There is an upper limit in the number of times that a block can be erased. In other words, the FM has a life, and the SSD including the large number of FMs also has a life. For example, if the FM reaches its end of life, reading and writing of data may not be performed correctly. If data cannot be read correctly, the SSD will be in a state where stored data is lost.

Further, the quality of the FMs may be dispersed in units of dies and chips. If the quality of the die is not good, failure may occur by the die reaching its life even before the number of erase counts reaches a predetermined target count, and the die becomes unusable. For example, SSD provides a storage capacity (hereinafter called logical capacity) to the user. However, if failure occurs to a part of the FM chips and the capacity cannot be maintained, the SSD will be blocked even if there are other FM chips having high quality and are in a usable state.

As described, if the SSD becomes unusable earlier than the predetermined period of time, the frequency of replacement increases, requiring costs for additional purchase or maintenance of SSDs, which may lead to the increase of TCO. Further, if the whole SSD is blocked when failure occurs to only a part of the FM chips, the large number of remaining usable FM chips will be wasted.

Patent Literature 1 discloses a technique in which a storage controller utilizes a capacity virtualization function to continuously use an SSD where failure has occurred to the FM chip without blocking the SSD.

A capacity virtualization function is a technique of providing a virtual capacity greater than a physical capacity of a storage unit as virtual volume to a host computer. In capacity virtualization, at first, a plurality of storage devices in the storage unit are gathered to create a pool, and storage areas in the pool are managed in units called chunks having a predetermined size. Then, in response to a write request from the host computer to the virtual volume, the storage unit allocates a chunk to the area in the virtual volume designated by the write request. In the capacity virtualization function, the storage controller can present a virtual capacity to the host, such that even if the logical capacity of the SSD is changed by capacity reduction processing, the storage controller can maintain a fixed size of the virtual capacity presented to the host, and the influence of the change can be hidden.

Thus, the storage controller can continue operation while reducing the logical capacity of the SSD in which failure has occurred to the FM, such that all the FM chips installed in the SSD can be used fully. In the present specification, a processing of reducing the logical capacity of an SSD is called "capacity reduction processing".

CITATION LIST

Patent Literature

[PTL 1] WO 2014/196000

SUMMARY OF INVENTION

Technical Problem

According to the conventional method, it was first necessary to recover lost data in order to execute the capacity reduction processing after the SSD has detected occurrence of failure of the FM chip (that is, after data stored in the FM had been lost). Patent Literature 1 disclose an art in which a storage controller uses a plurality of SSDs in a RAID (Redundant Arrays of Independent (or Inexpensive) Disks) configuration, and recovers (rebuilds) lost data that a certain SSD had lost using data and parity acquired from a different SSD assembling the RAID configuration. However, since rebuild processing causes increase of load of the storage controller, it may deteriorate the overall I/O (Input/Output) performance of the storage unit.

Solution to Problem

According to one aspect of the present invention, the storage unit includes a storage controller and a plurality of storage devices. The storage device includes a nonvolatile storage medium and a device controller, and provides a storage space having a predetermined size to the storage controller. As a result of diagnosis of each storage area of the nonvolatile storage medium, if there is a storage area that is close to end of life, the device controller blocks the storage area, and reduces the size of the storage space corresponding to the size of the blocked storage area.

Advantageous Effects of Invention

Since data rebuild processing that has been performed prior to capacity reduction processing will be unnecessary, it becomes possible to suppress performance degradation of the storage unit.

BRIEF DESCRIPTION OF DRAWINGS

FIG. 8 is a view illustrating a configuration of a virtual volume management table.

FIG. 9 is a view illustrating a configuration of a pool management table.

FIG. 10 is a view illustrating a configuration of a RAID group management table.

FIG. 12 is a view illustrating a configuration of a configuration information management table.

FIG. 13 is a view illustrating a configuration of a logical-physical conversion table.

FIG. 14 is a view illustrating a configuration of a block management table.

FIG. 17 is a view illustrating a configuration of an FM error bit characteristic table.

FIG. 18 is a view illustrating a configuration of an FM life characteristic table.

DESCRIPTION OF EMBODIMENTS

Now, a few embodiments will be described.

In the following description, it is assumed that a storage device is an SSD. A nonvolatile semiconductor storage medium included in the SSD is assumed to be a flash memory (FM). The flash memory should be a flash memory of the type where read/write is performed in page units, typically a NAND type flash memory. However, flash memories other than the NAND type can also be used. Further, nonvolatile semiconductor storage media other than the flash memory, such as a phase-change memory, can also be adopted.

Before starting the description of the embodiments, various terms used in the following description of embodiments will be explained.

A "page" is a minimum unit of read/write in a flash memory, and a size of a page is, for example, 8 KB. In the present specification, two concepts are adopted, which are a "physical page" and a "logical page". The physical page is used as a term referring to a physical storage area on a flash memory chip. A "logical page" refers to a logical storage area formed by dividing a storage space that a storage device (such as an SSD) using the flash memory provides to a storage controller into predetermined sizes. A term simply referred to as "page" refers to a "physical page".

"Reclamation" is a processing for making used blocks in a flash memory usable again. In reclamation processing, reusable blocks are generated by erasing one or more blocks. During block erase, data in a page being used is moved to a different block.

In the present specification, "refresh" refers to a processing of reading data stored in a physical page (or a block) and migrating the data to a different physical page (block).

First Embodiment

Figure 1:
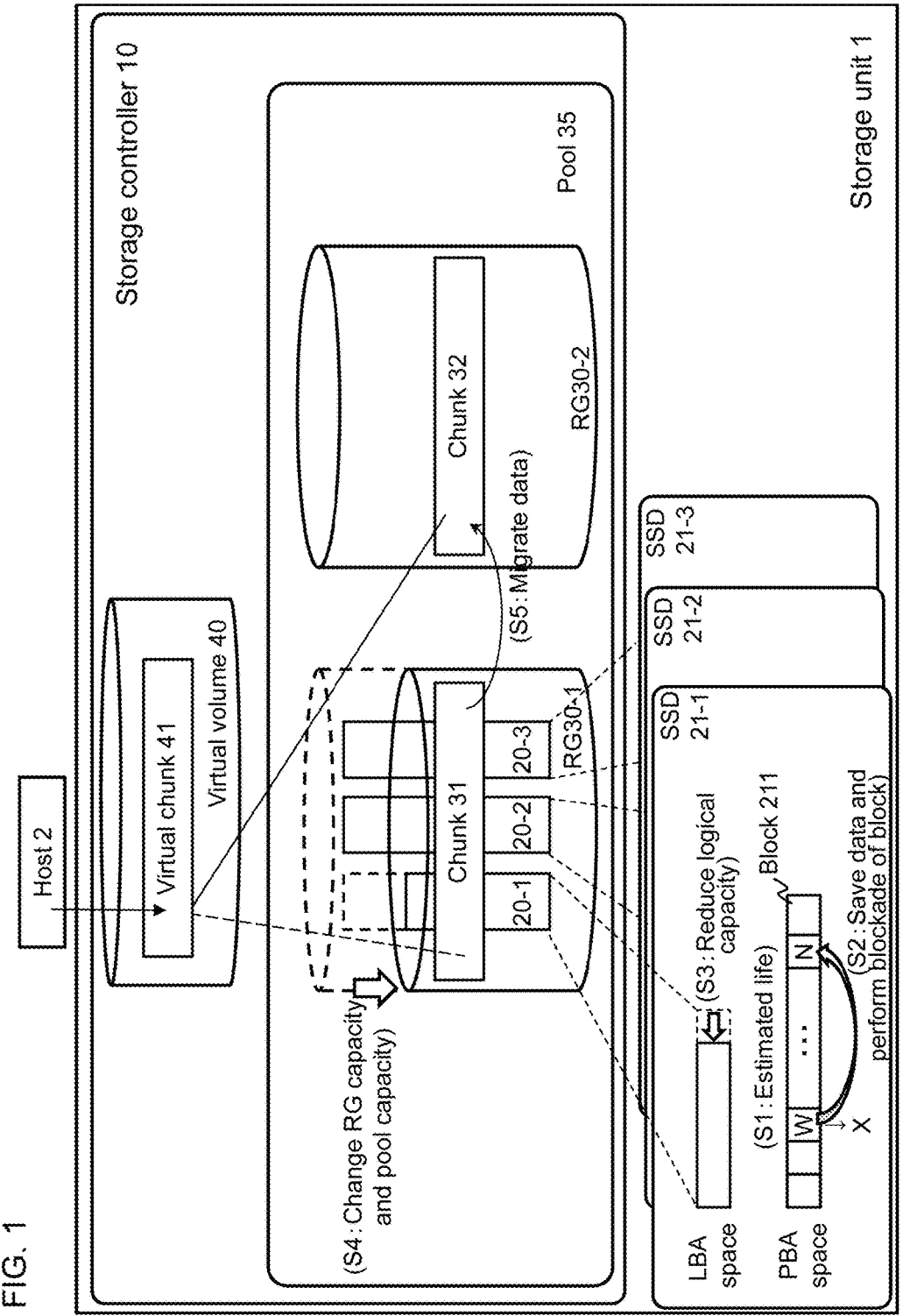
FIG. 1 is a view illustrating an outline of the present invention.

First, an outline of a first embodiment will be described with reference to FIG. 1.

A storage unit 1 includes SSDs 21-1 through 21-3 each of which is an example of a storage device (typically a nonvolatile storage device), and a storage controller 10 for controlling the storage devices.

The SSD 21-1 includes a logical address space (LBA space) presented to the storage controller 10, and a physical address space (PBA space) storing actual data. In the present specification, the size of the logical address space is defined as logical capacity, and the size of the physical address space is defined as physical capacity. The physical address space of the SSD 21-1 is configured of FM chips. In the drawing, a plurality of blocks 211 are illustrated. The SSD cannot overwrite data stored in the block (more precisely, the page), and data must be written to a different, already-erased block, such that a PBA space greater than the LBA space is provided. The mapping between LBA space and PBA space can be change dynamically, and it is managed by a logical-physical conversion table 1100 described later.

Next, the storage controller 10 configures a RAID group (RG) 30-1 by integrating SSDs 21-1 through 21-3 (more strictly, logical capacities 20-1 through 20-3 provided by the SSDs 21-1 through 21-3). Although not shown, other SSDs are integrated to configure The RAID group 30-2. Further, the storage controller 10 integrates two RAID groups (RG) 30-1 and 30-2 to configure a pool 35. The storage controller 10 divides the storage area of the RAID group into sections each of which has a predetermined size for management. These sections are called "chunks". In the example illustrated in FIG. 1, a chunk 31 is created in the RAID group (RG) 30-1, and a chunk 32 is created in the RAID group 30-2.

The storage unit 1 is connected to a host computer (host 2), and provides a virtual volume 40 to the host computer 2. The virtual volume 40 is a virtual volume configured using a thin-provisioning technique (capacity virtualization function), for example. In a state where the storage controller 10 receives a write request to the virtual volume 40 from the host computer 2, it allocates an arbitrary chunk in the RAID group to a virtual chunk 41 in the virtual volume 40, and writes data accompanying the write request to the chunk.

If necessary, the storage controller 10 executes a chunk migration processing in which the data in the chunk 31 in the RAID group (RG) 30-1 is migrated to the chunk 32 in the RAID group 30-2, for example. At this time, the storage controller 10 changes the chunk allocated to the virtual chunk 41 from the chunk 31 to the chunk 32.

The SSD 21-1 has a function to detect the number of error bits or the number of erase when it read data from a page of the FM chip, and to grasp a deterioration state of the FM chip based on the result. The blocks are managed according to the level of deterioration as one of the following three states. (1) A block estimated to have little deterioration and have much time until end of life (block denoted as N in FIG. 1); (2) a block estimated to have deterioration advanced, and close to end of life (block denoted as W in FIG. 1); and (3) block suspended of use (in other words, blocked) by the SSD 21-1 since it has reached its end of life or there is a high risk of reaching end of life (block denoted as X in FIG. 1).

When a block is blocked, the SSD 21-1 reduces a logical capacity 20-1. Therefore, the SSD 21-1 notifies a change request of logical capacity 20-1 to the storage controller 10. The storage controller 10 having received a notification from the SSD 21-1 reduces the capacity of the RAID group (RG) 30-1 and the pool 35 to which the SSD 21-1 belongs. Since the RAID group (RG) 30-1 stores data in chunk units, the capacity of the RAID group (RG) 30-1 is equal to N times the capacity of an SSD having the smallest logical capacity (N being the number of SSDs constituting the RAID group). Further, if the capacity of the RAID group (RG) 30-1 is reduced, a part of the data stored in the RAID group 30-1 may overflow. Therefore, the storage controller 10 migrates the data in the chunk to a different The RAID group 30-2 to prevent data overflow of the RAID group (RG) 30-1. During migration of the data in the chunk, the storage controller 10 can select an arbitrary chunk as the migration target.

Next, a flow of the processing performed in the storage unit 1 according to the first embodiment will be described. (For convenience of description, there are cases where the execution timing of processing differs from the detailed description of FIG. 2 and subsequent drawings.)

The SSD 21-1 monitors the deterioration state of the blocks periodically, and if it detects a block estimated to be close to end of life (state of block is W) (S1), it moves the data in the block to a different block having sufficient life (state of block is N), and makes the status of the block blockade (S2). Next, the SSD 21-1 notifies the storage controller 10 that the logical capacity 20-1 has been reduced (S3). The storage controller 10 having received the notice from the SSD 21-1 carries out a capacity change processing of the RAID group (RG) 30-1 and the pool 35 based on a reduction amount of the logical capacity 20-1 (S4). At this time, if it is estimated that data will overflow from the RAID group (RG) 30-1, data in the chunk is migrated to a different RAID group 30-2 having spare capacity (S5), to prevent data overflow of the RAID group (RG) 30-1. At this time, the host computer 2 will not detect this sequence of processes, since the storage controller 10 continues to maintain the capacity of the virtual volume 40 provided to the host computer 2.

As described, in the storage unit according to one preferred embodiment of the present invention, the occurrence of a rebuild processing that had been required in conventional capacity reduction processing can be suppressed, so deterioration of performance of a storage unit by the rebuild processing can be suppressed.

Figure 2:
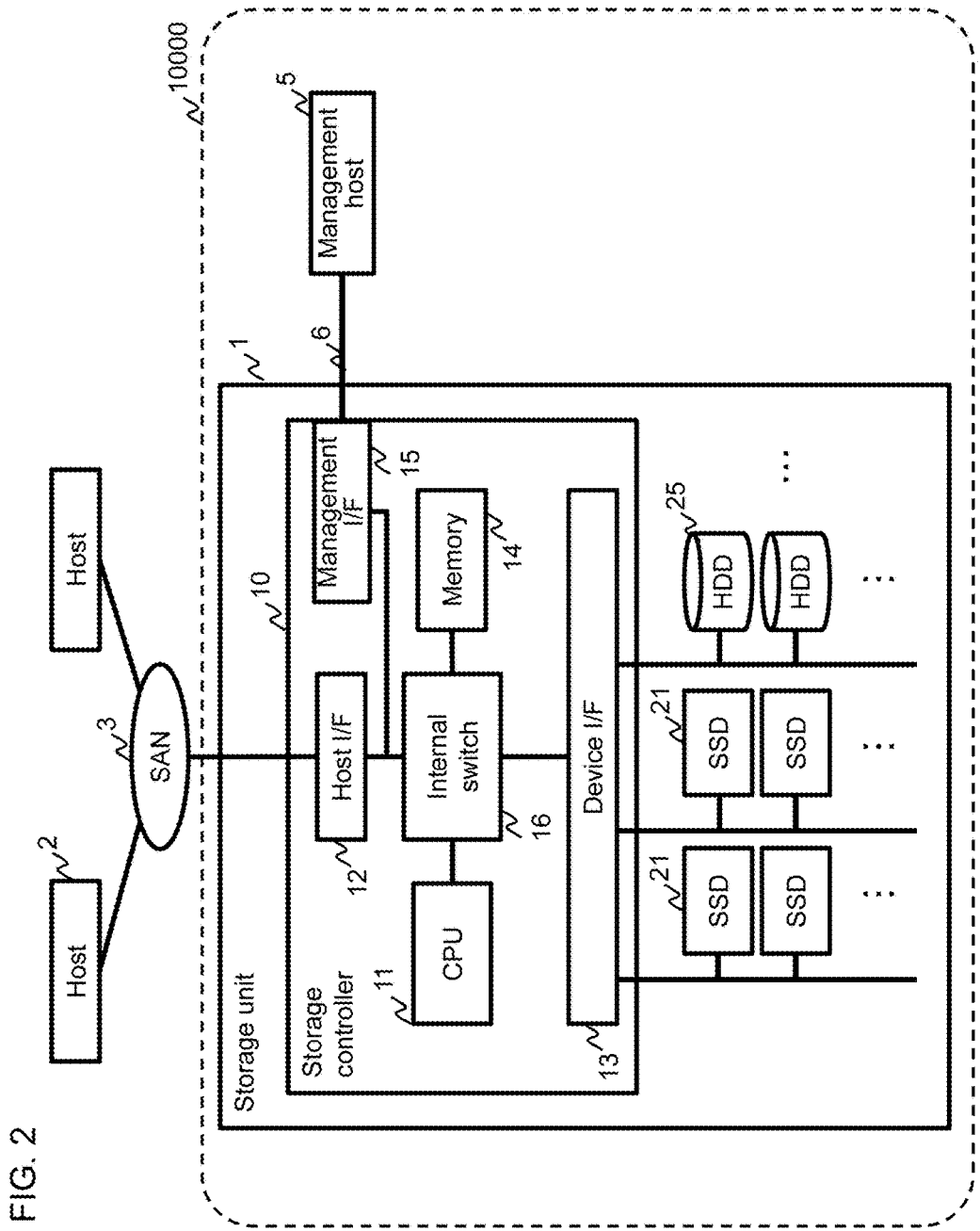
FIG. 2 is a view illustrating a configuration example of a storage system 10000 including a storage unit 1 according to a first embodiment.

FIG. 2 is a view illustrating a configuration example of a storage system 10000 including the storage unit 1 according to the first embodiment.

The storage unit 1 includes a storage controller 10, and a plurality of SSDs 21 connected to the storage controller 10.

The SSD 21 is a storage device storing write data from an upper-level device such as a host 2, and adopts a nonvolatile semiconductor memory like a flash memory as a storage medium. An internal configuration of the SSD 21 will be described later. Each SSD 21 is connected to the storage controller 10 via a transmission line compliant with, for example, SAS (Serial Attached SCSI) standards (SAS link) or PCI (Peripheral Component Interconnect) standards (PCI link).

Further, as illustrated in FIG. 2, other than the SSD 21, an HDD (Hard Disk Drive) 25 can also be installed to the storage unit 1 of the present embodiment. The HDD 25 is a storage device having a magnetic disk as a storage medium. Similar to the SSD 21, the HDD 25 is also connected to the storage controller 10. Similar to the SSD 21, the HDD 25 is connected to the storage controller 10 via an SAS link and the like. But in the following description, a configuration is mainly described in which only the SSDs 21 are connected as the storage device to the storage unit 1 of the present embodiment.

One or more hosts 2 are connected to the storage controller 10. Further, a management host 5 is connected to the storage controller 10. The storage controller 10 and the host 2 are connected via a SAN (Storage Area Network) 3 formed using Fibre Channel, as an example. The storage controller 10 and the management host 5 are connected via a LAN (Local Area Network) 6 formed using Ethernet, as an example.

The storage controller 10 includes, at least, a processor (CPU) 11, a host interface (denoted as "host I/F" in the drawing) 12, a device interface (denoted as "device I/F" in the drawing) 13, a memory 14, and a management I/F 15. The processor 11, the host I/F 12, the device I/F 13, the memory 14 and the management I/F 15 are mutually connected via an internal switch (internal SW) 16. Only one each of these components are illustrated in FIG. 2, but in order to ensure high performance and high availability, a plurality of each component can be installed in the storage controller 10. The respective components can be mutually connected via a common bus instead of the internal SW 16.

The device I/F 13 includes at least an interface controller and a transfer circuit. The interface controller is a component for converting a protocol (such as the SAS) used in the SSD 21 to a communication protocol (such as the PCI-Express) used inside the storage controller 10. The transfer circuit is used for transferring (reading or writing) data from the storage controller 10 to the SSD 21.

Similar to the device I/F 13, the host I/F 12 at least includes an interface controller and a transfer circuit. The interface controller of the host I/F 12 is used for converting the communication protocol (such as Fibre Channel) used in a data transfer path between the host 2 and the storage controller 10 to a communication protocol used inside the storage controller 10.

The processor 11 performs various control of the storage unit 1. The memory 14 is used for storing programs executed by the processor 11 and various management information of the storage unit 1 used by the processor 11. Further, the memory 14 is also used for temporarily storing I/O target data with respect to the SSD 21. Hereafter, the storage area in the memory 14 used for temporarily storing the I/O target data with respect to the SSD 21 is called a "cache". The memory 14 is composed of a volatile storage medium such as a DRAM or an SRAM, but as another embodiment, the memory 14 can be composed of a nonvolatile memory.

The management host 5 is a computer for performing management operation of the storage unit 1. The management host 5 comprises an input/output device (not shown) such as a keyboard and a display, and the user (administrator) can set or enter instruction to the storage unit 1 through the input/output device. Further, the management host 5 can display information such as the status of the storage unit 1 on an output device such as a display.

Figure 3:
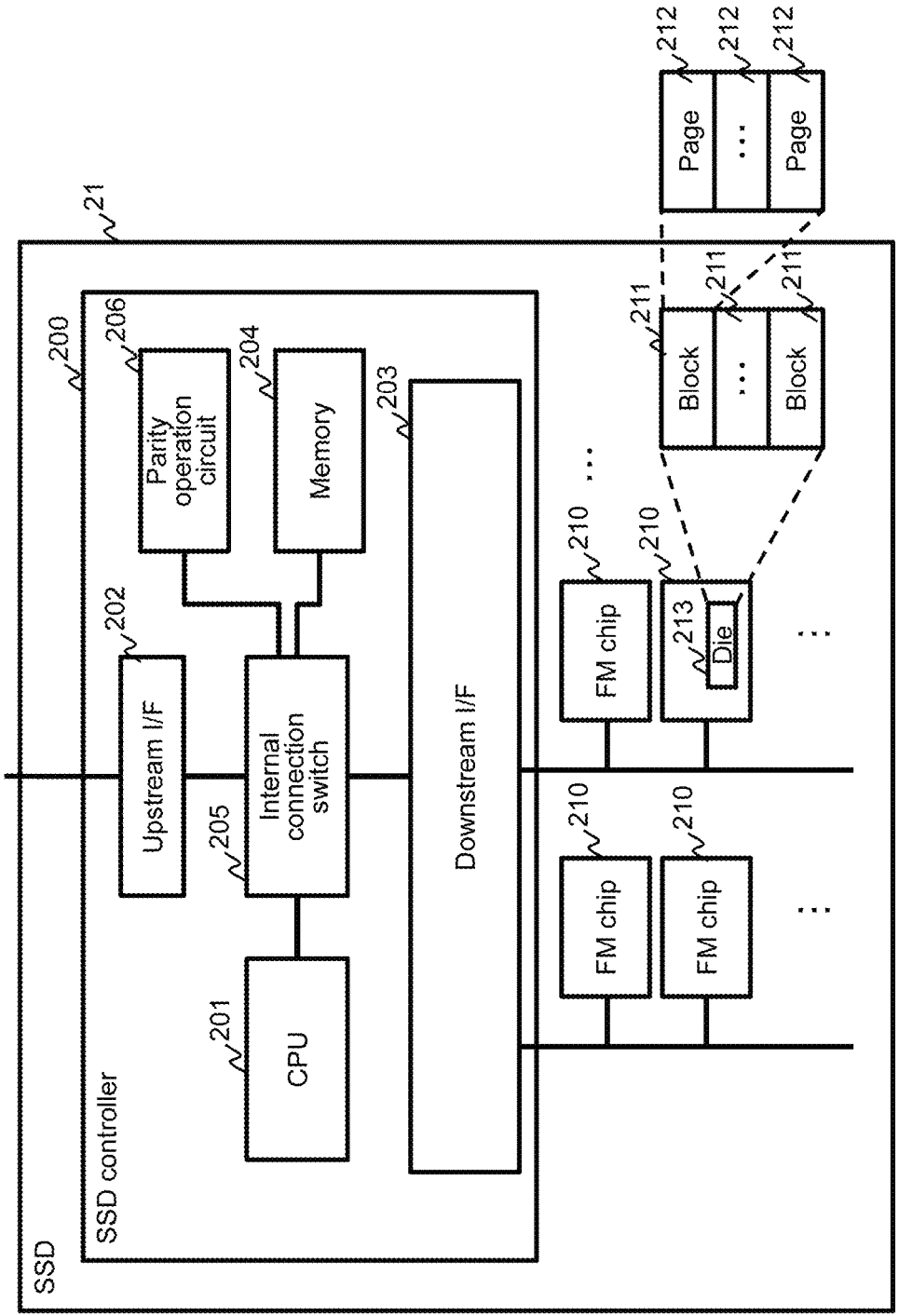
FIG. 3 is a view illustrating a configuration example of an SSD 21.

FIG. 3 is a view illustrating a configuration example of the SSD 21.

The SSD 21 is composed of an SSD controller 200 and a plurality of FM chips 210. The SSD controller 200 includes a processor (CPU) 201, an upstream I/F 202, a downstream I/F 203, a memory 204, and a parity operation circuit 206, which are mutually connected via an internal connection switch (internal connection SW) 205.

The upstream I/F 202 is an interface controller for performing communication between the SSD 21 and the storage controller 10. The upstream I/F is connected to a device IF 13 of the storage controller 10 via a transmission line (such as a SAS link or a PCI link). The downstream I/F 203 is an interface controller for performing communication between the SSD controller 200 and the FM chips 210.

Further, the downstream I/F 203 has a function to generate ECC (Error Correcting Code), detect and correct error using the ECC. BCH code or LDPC (Low Density Parity Check) code can be used as an example of the ECC. When data is transmitted (written) from the SSD controller 200 to the FM chip 210, the downstream I/F 203 generates ECC. The downstream I/F 203 adds the generated ECC to the data, and the data having ECC added thereto is written to the FM chip 210. When the SSD controller 200 reads data from the FM chip 210, ECC-added data is read from the FM chip 210, and the ECC-added data arrives at the downstream I/F 203. The downstream I/F 203 uses the ECC to perform a data error check (generate ECC from data, and check whether the generated ECC is the same as the ECC added to the data), and if data error is detected, data correction is performed using the ECC. It also has a function in which, if data error occurs, the occurred number of data error is notified to the CPU 201.

The CPU 201 performs processing related to various commands arriving from the storage controller 10. The memory 204 stores programs executed by the processor 201, and various management information. Further, a part of the area in the memory 204 is used as a buffer for temporarily storing write data transmitted with a write command from the storage controller 10, or data read from the FM chips 210. A volatile memory such as a DRAM is used as the memory 204. However, a nonvolatile memory can also be used as the memory 204.

The parity operation circuit 206 is a circuit to create parity data in the SSD 21. However, the parity operation circuit 206 is not indispensable in the SSD 21 according to the first embodiment. The example of use of the parity operation circuit 206 will be described with reference to a second embodiment.

The FM chips 210 are nonvolatile semiconductor memory chips such as NAND-type flash memories. As well known, data is read and written in units of pages 212 in the flash memory, and data erase is performed in units of blocks 211, which are a set of pages 212. A page to which data has been written once cannot be overwritten, and in order to rewrite data to a page to which data has been written once, the whole block including the page must be erased. A plurality of dies 213 as a set of blocks 211 exist within the FM chip 210, and a plurality of pages 212 exist within the block 211.

The SSD 21 according to the present embodiment should merely be a storage device having a plurality of nonvolatile storage media (such as a flash memory) and a device controller for controlling them, and the form factor is not restricted to conventional HDDs or SSDs. Further, in addition to a NOR type or a NAND type flash memory, various types of semiconductor memories, such as an MRAM (Magnetoresistive Random Access Memory) serving as a magnetoresistance memory, a ReRAM (Resistance Random Access Memory) serving as a resistance-change memory, or a FeRAM (Ferroelectric Random Access Memory) serving as a ferroelectric memory, can be used as the nonvolatile storage medium.

Next, we will describe the logical capacity and the physical capacity of the SSD 21 according to the present specification, and change of these capacities associated with the blockade of blocks.

Figure 4:
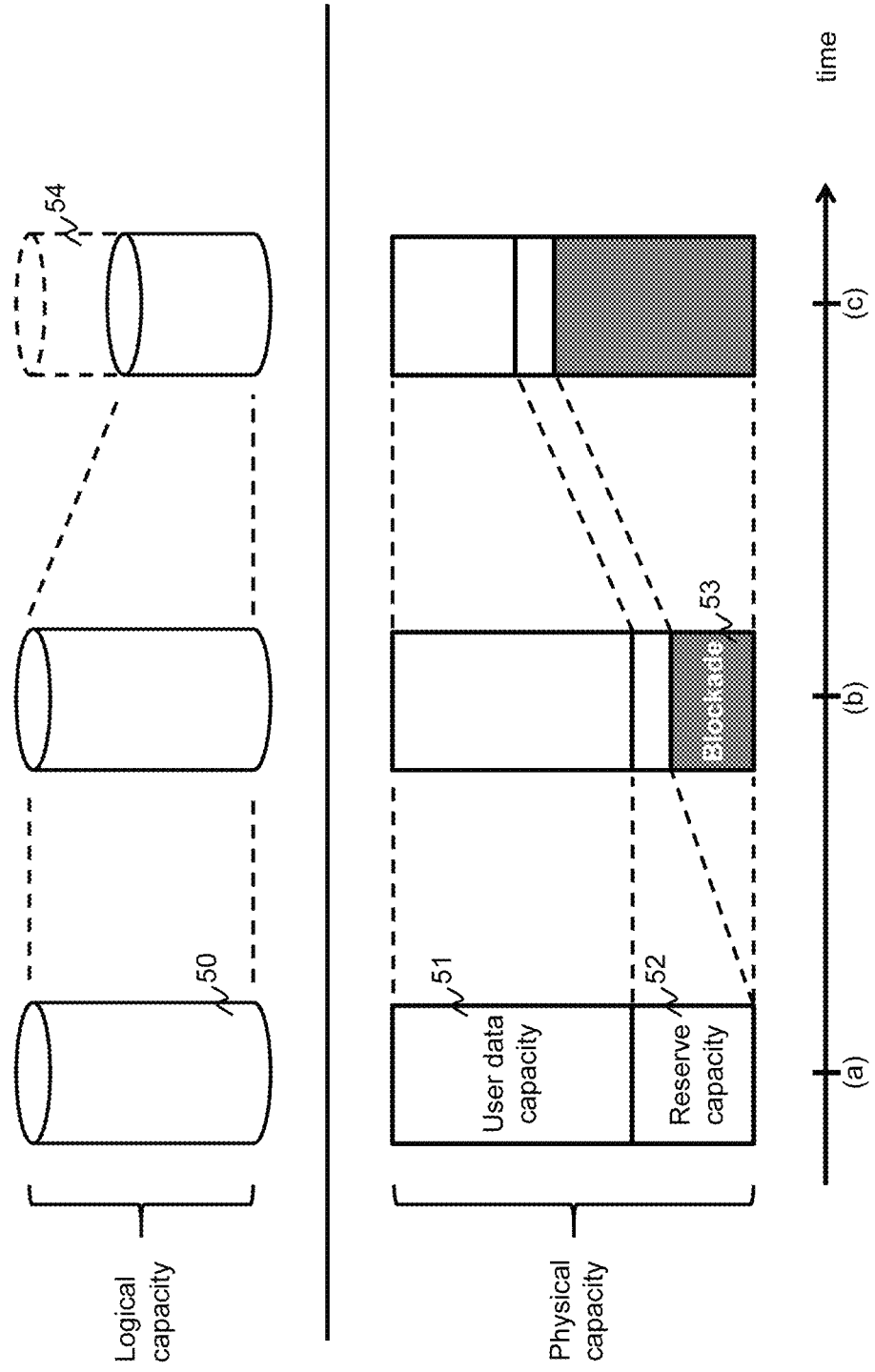
FIG. 4 is a conceptual diagram illustrating a relationship between logical capacity and physical capacity of SSD.

FIG. 4 is a conceptual diagram illustrating the relationship between logical capacity and physical capacity of the SSD. The cylinders illustrated on the upper side of FIG. 4 represent the logical address space that the SSD 21 provides to the storage controller 10. The height of the cylinder represents the logical capacity (corresponding to logical capacities 20-1 through 20-3 of FIG. 1) of the logical address space. For example, if the logical capacity of the SSD 21 is 1.0 TB, the storage controller 10 recognizes that data corresponding to a total of 1.0 TB can be stored in the SSD 21.

Next, the rectangles illustrated on the lower side of FIG. 4 represent the physical address space included in the SSD 21, and the height of the rectangle indicates the physical capacity thereof. The physical capacity of the SSD 21 is largely classified into user data capacity 51 and reserve capacity 52, and the total value thereof is equal to a total capacity of the FM chips 210 installed in the SSD 21.

The user data capacity 51 corresponds to a logical capacity 50, and it is an amount of storage area allocated to store data written by the user or from the storage controller 10. Therefore, the size of the user data capacity 51 and the size of the logical capacity 50 are equal.

Meanwhile, reserve capacity is a capacity required to execute reclamation processing in which the SSD 21 generates erased blocks. In general, the SSD cannot generate erased blocks if the reserve capacity 52 is depleted, so the reserve capacity 52 is a capacity essential to the SSD. In the present embodiment, the minimum value of reserve capacity required for the SSD 21 to execute the reclamation processing is called "minimum reserve capacity". However, since reclamation processing can be performed efficiently by securing a large reserve capacity 52, in a general SSD, a spare amount is provided in the reserve capacity 52. Also, in the SSD 21 according to the present embodiment, the initial value of the reserve capacity 52 is set greater than the minimum reserve capacity.

Inside the SSD 21, the blocks 211 and pages 212 are used by assigning roles, for storing user data or for spare. However, the roles of the respective blocks 211 and pages 212 are not fixed, and they can be changed dynamically.

Next, a method for managing the logical and physical capacities in a state where the block is blocked will be described. A horizontal axis of FIG. 4 shows an elapse of time. A horizontal axis of FIG. 4 illustrates elapse of time. Initial state of the SSD 21 is illustrated at (a) in FIG. 4, where no failure has occurred to any of the FM chips 210. At (b), the state where some of the blocks have been blocked is illustrated. When a block is to be blocked, the SSD 21 reduces the reserve capacity 52 at first. However, in the state (b), the size has reached the minimum reserve capacity. Since the user data capacity 51 is maintained until (b), the logical capacity 50 will not be changed. Next, (c) illustrates the state where further blockade of blocks has occurred from the state of (b). At this time, since the SSD 21 cannot reduce the reserve capacity 52, it reduces the user data capacity 51. Therefore, reduction of the logical capacity 50 occurs. Thereafter, each time a blockade of a block occurs in the SSD 21, the SSD 21 reduces the logical capacity 50.

Next, a storage area in the RAID group will be described with reference to FIG. 5. The storage unit 1 manages a plurality of SSDs 21 as one RAID group. Then, in a state where failure has occurred to one (or two) SSDs 21 in the RAID group and data could not be accessed, the data stored in the remaining SSDs 21 are used to recover the data stored in the SSD 21 in which failure has occurred.

Figure 5:
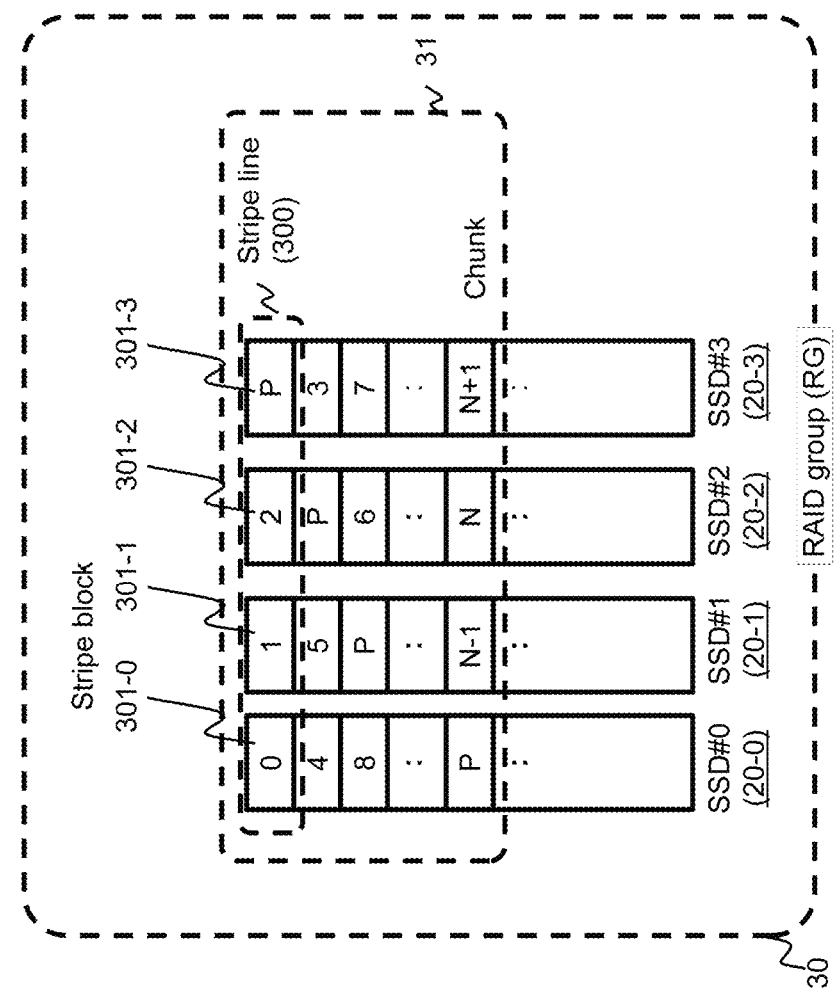
FIG. 5 is an explanatory view of a RAID group.

In FIG. 5, SSD #0 (20-0) through SSD #3 (20-3) respectively represent the logical address space (LBA space) that the SSDs 21 provide to the storage controller 10. Upper ends of SSD #0 (20-0) through SSD #3 (20-3) represent an initial address (LBA=0) of the logical address space, and lower ends represent ends of the logical address space. The storage controller 10 configures one RAID group 30 from a plurality of (four, in the example of FIG. 5) SSDs 20, and divides the logical address spaces (SSD #0 (20-0) through SSD #3 (20-3)) of the respective SSDs 21 belonging to the RAID group 30 into a plurality of storage areas having a fixed size called stripe blocks (301) for management.

Further, FIG. 5 illustrates an example in which a RAID level (representing a data redundancy method in a RAID technique, which generally includes RAID levels from RAID 1 to RAID 6) of the RAID group 30 is RAID 5. In FIG. 5, boxes denoted by "0", "1" and "P" in the RAID group 30 represent stripe blocks, and the size of each stripe block is 64 KB, 256 KB or 512 KB, for example. Further, a number such as "1" assigned to each stripe block is referred to as "stripe block number".

Among the stripe blocks in FIG. 5, the stripe block denoted by "P" represents a stripe block in which redundant data (parity) is stored, and this block is called a "parity stripe". Meanwhile, the stripe blocks denoted by numerals (0, 1 and so on) are stripe blocks storing data (data that is not redundant data) written from upper-level devices such as the host 2. These stripe blocks are called "data stripes". Redundant data generated using a plurality of data stripes is stored in the parity stripe.

In the followings, a set composed of a parity stripe and data stripes (for example, element 300 of FIG. 5) used for generating redundant data stored in the relevant parity stripe is called a "stripe line". In the case of the storage unit 1 according to the present embodiment, as illustrated in stripe line 300 of FIG. 5, the stripe lines are configured based on a rule that each stripe block belonging to a single stripe line exists at the same location (address) in SSD #0 (20-0) through SSD #3 (20-3).

The storage controller 10 manages the plurality of stripe lines continuously arranged in the RAID group in management units called "chunks". As illustrated in FIG. 5, one chunk 31 includes a plurality of stripe lines. However, a configuration can be adopted where one chunk 31 includes only one stripe line.

Further, the storage controller 10 provides one or more virtual storage spaces to the host 2 that differs from the storage area of the RAID group. The virtual storage space is called a "virtual volume". The storage space of the virtual volume is divided into areas having a predetermined size and managed. The area having the predetermined size is called a "virtual chunk". A virtual chunk is an allocation unit of the storage area of the virtual volume.

One chunk is mapped to one virtual chunk, and when data write occurs from the host 2 to the virtual chunk, data is stored in the mapped chunk. However, when a chunk is mapped to the virtual chunk, only the data stripe within the chunk is mapped. Therefore, the size of the virtual chunk is equal to the total size of all data stripes included in the chunk. The storage controller 10 records the mapping of the virtual chunk and chunk to a virtual volume management table 500 described later, in order to manage the storage area (chunk) being allocated to the virtual chunk.

Immediately after the virtual volume has been defined, no chunk is mapped to the respective virtual chunks in the virtual volume. When a write request is received from the host 2 to the area in the virtual chunk for the first time, the storage controller 10 decides the storage area (chunk) on the logical address space of the SSDs 21 where data written to the relevant area is to be stored. The chunk determined at this time is chosen from chunks that are not yet allocated to any virtual chunk (unused chunk).

Figure 6:
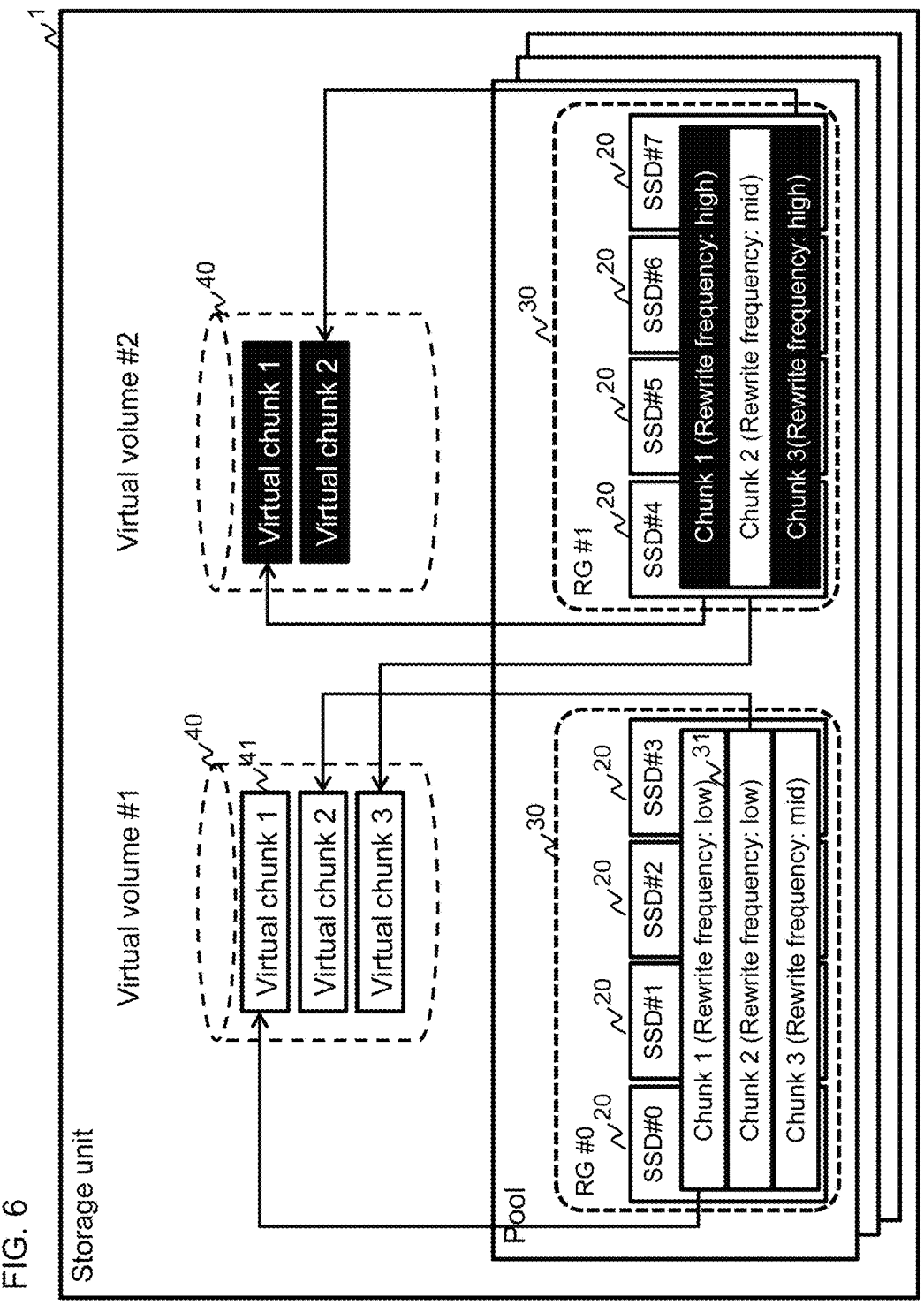
FIG. 6 is a view illustrating a relationship among virtual volume and RAID group, and pool.

FIG. 6 is a view illustrating the relationship among virtual volume, RAID group and pool.

In the storage unit 1 according to the present embodiment, a certain restriction exists in the chunk that can be allocated to a virtual chunk of a certain virtual volume. The one or more RAID groups having storage areas (chunks) that can be allocated (mapped) to the virtual chunk are managed in each managed units called pools. The storage unit 1 can manage one or more pools, and if the storage unit 1 manages a plurality of pools, each of the one or more RAID groups having storage areas that can be allocated to the virtual chunk are managed in one of the plurality of pools. Hereafter, the RAID groups (and the chunks in the RAID group) managed in a certain pool (temporarily called pool X) are called "RAID groups (and chunks) belonging to pool X". If a chunk is allocated to (a virtual chunk of) each virtual volume, one pool to which an allocatable chunk belongs is determined in advance in each virtual volume.

Figure 7:
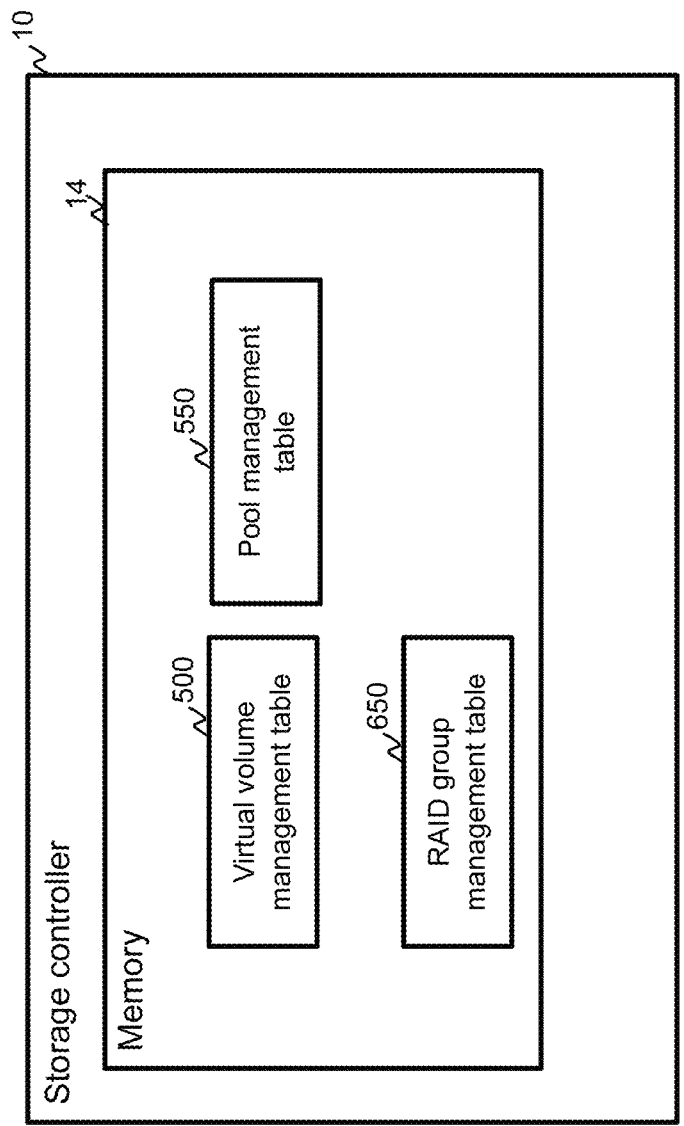
FIG. 7 is a view illustrating contents of management information stored in a memory of a storage controller.

FIG. 7 is a view illustrating a content of management information stored in the memory of the storage controller.

The memory 14 of the storage controller 10 includes at least a virtual volume management table 500, a pool management table 550, and a RAID group management table 650. The contents of these management tables will be described below.

FIG. 8 is a view illustrating a configuration of a virtual volume management table.

The virtual volume management table 500 is a table managing a mapping relationship of virtual chunks in the respective virtual volumes defined in the storage unit 1 and the chunks. The virtual volume management table 500 includes columns of a virtual volume #501, a pool #502, a virtual volume LBA range 503, a virtual chunk number 504, a RAID group number 505, and a chunk number 506. Each row (record) of the virtual volume management table 500 shows that a chunk specified by the RAID group number 505 and the chunk number 506 is mapped to the virtual chunk specified by the virtual volume #501 and the virtual chunk number 504. Hereafter, the rows in the tables managing various information, not restricted to the virtual volume management table 500, are called "records".

In the initial state, a chunk is not mapped to a virtual chunk. At a point of time when a write request to a virtual chunk is received from the host 2, a chunk is mapped to the virtual chunk. If a chunk is not mapped to the virtual chunk specified by the virtual chunk number 504, an invalid value (NULL) is stored in the RAID group number 505 and the chunk number 506 of the relevant record.

The pool #502 stores an identification number of a pool to which chunks allocatable to the virtual volume belong. That is, chunks allocatable to the virtual chunks in the virtual volume specified by the virtual volume #501 are basically restricted to the chunks (or RAID group(s)) belonging to the pool #502. Further, the virtual volume LBA range 503 is information indicating which area in the virtual volume the virtual chunk specified by the virtual chunk number 504 corresponds to. As an example, in row (record) 500-1 of FIG. 8, since the virtual volume LBA range 503 is "0x0500 to 0x09FF", and the virtual chunk number 504 is "2", it indicates that virtual chunk #2 in virtual volume #0 corresponds to the area whose LBA is between 0x0500 and 0x09FF in the virtual volume #0.

FIG. 9 is a view illustrating a configuration of a pool management table.

A pool is managed by the pool management table 550. The pool management table 550 includes columns of a pool #551, an RG #552, a chunk #553, a RAID group LBA 554, a status 555, and a remaining capacity of pool 556. In the pool management table 550, each record is for storing information related to a chunk. The RG #552 of each record shows the RAID group number of the RAID group to which the chunk belongs, and the pool #551 represents the pool number of the pool to which the chunk belongs. Further, the pool #551 can be described as representing the pool number to which the RAID group specified by the RG #552 belongs.

The RAID group LBA 554 of each record represents information showing which area in the RAID group the chunk is located. The status 555 is information showing whether or not the chunk is allocated (mapped) to a virtual chunk. If "allocated" is stored in the status 555, it means that the chunk is allocated to a virtual chunk. In contrast, if "unallocated" is stored in the status 555, it means that the chunk is not allocated to the virtual chunk. Further, if "non-allocatable" is stored in the status 555, it means that the chunk cannot be allocated to the virtual chunk. Specifically, it is a chunk that cannot store data (or the storage controller 10 has stopped storing data) accompanying the reduction of capacity of the SSD. The remaining capacity of pool 556 is a total size of the chunk(s) whose status 555 is/are "unallocated". The remaining capacity of pool 556 is also called an unused capacity of pool.

FIG. 10 is a view illustrating a configuration of a RAID group management table.

The RAID group is managed by the RAID group management table 650. The RAID group management table 650 includes columns of an RG #651, a drive number 652, a RAID group LBA 653, a RAID level 654, a drive capacity 655, and a RAID group remaining capacity 656. A RAID group number of the RAID group is stored in the RG #651, and an identifier of the SSD 21 belonging to the RAID group specified by the RG #651 is stored in the drive number 652. The RAID group LBA 653 is information indicating which area of the RAID group the respective areas of the SSD 21 specified by the drive number 652 are located.

The RAID level 654 indicates a RAID configuration of the relevant RAID group. The drive capacity 655 stores a logical capacity of the storage device (SSD 21) specified by the drive number 652. The drive capacity 655 may vary in accordance with the capacity reduction. The RAID group remaining capacity 656 is a total value of the unused portion of the RAID group, that is, the total value of the portion not mapped to the virtual chunk among the areas in the RAID group.

Figure 11:
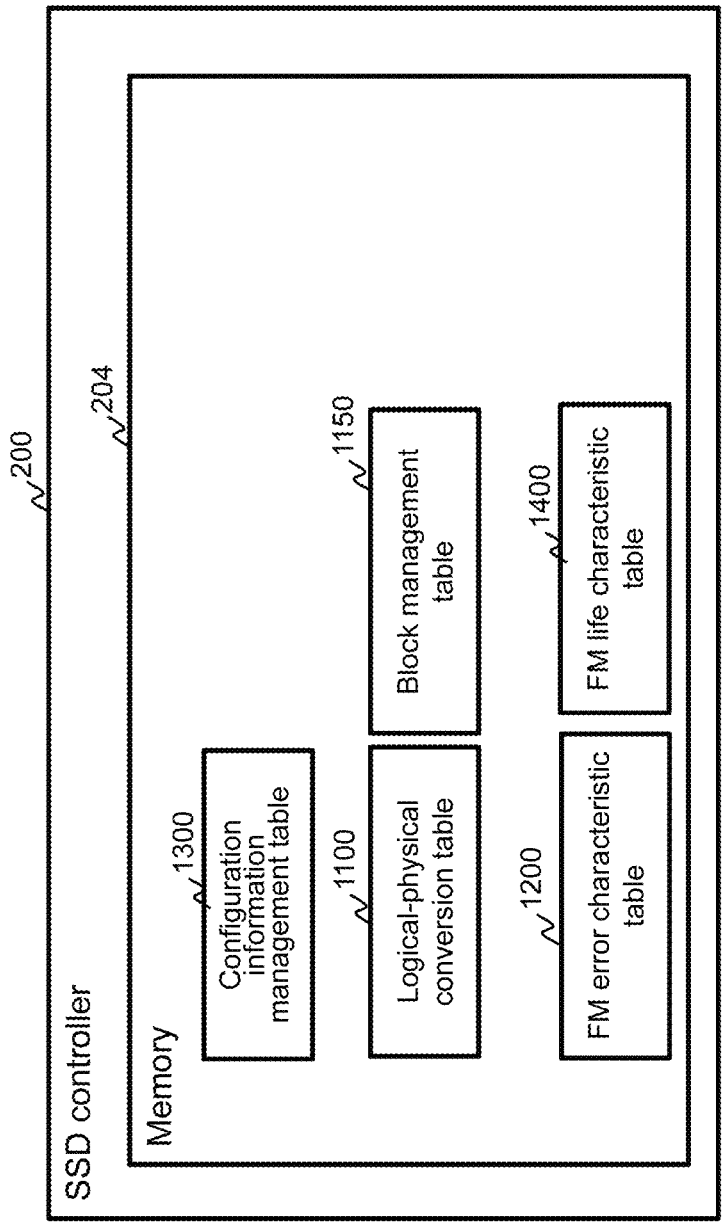
FIG. 11 is a view illustrating contents of management information stored in a memory of an SSD controller.

FIG. 11 is a view illustrating a content of a management information stored in the memory of the SSD controller.

A logical-physical conversion table 1100, a block management table 1150, an FM error characteristic table 1200, a configuration information management table 1300, and an FM life characteristic table 1400 are at least stored in the memory 204 of the SSD 21.

FIG. 12 is a view illustrating a configuration of a configuration information management table.

The configuration information management table 1300 stores information related to the capacity of the SSD 21. The configuration information management table 1300 includes columns of a total physical capacity 1301, a logical capacity 1302, a reserve capacity 1303, a blocked capacity 1304, and a minimum reserve capacity 1305. The total physical capacity 1301 is a total capacity of the FM chip included in the SSD 21. The logical capacity 1302 is a logical capacity that the SSD 21 currently provides to the user or the storage controller 10. The reserve capacity 1303 is the size of the reserve capacity at the current time point of the SSD 21. The blocked capacity 1304 is a total size of the block of the FM chip(s) which is/are in a blocked state at the current time point. The minimum reserve capacity 1305 is a minimum reserve capacity size required for the SSD 21 to execute reclamation. That is, in FIG. 12, the relevant SSD has a total physical capacity of 3.0 TB, and at the current time point, a capacity of 1.6 TB is provided as logical capacity to the user or the storage controller 10. The relevant SSD has a reserve capacity of 1.0 TB at the current time point, and it shows that 0.4 TB of blocks are in the blocked state.

FIG. 13 is a view illustrating a configuration of a logical-physical conversion table. The SSD 21 according to the present embodiment has a plurality of FM chips 210. The SSD 21 assigns a unique identification number within the SSD 21 to each block in all the FM chips 210, and this identification number is called a block number (block #). A number unique within a block is assigned to each page in the block for management, and this number is called a physical page number (or physical page #). When the block # and the physical page # are specified, the physical page in the SSD 21 can be uniquely specified.

The SSD 21 divides the logical address space included in the SSD 21 into predetermined sized areas for management. This area is called a "logical page". A unique identification number within the SSD is assigned to each logical page. This identification number is called a logical page number (logical page #). The logical-physical conversion table 1100 is a table for managing mapping of the logical page managed by the SSD 21 and the physical page, and information of block # and physical page # of the physical page mapped to the logical page is stored per logical page in the logical-physical conversion table 1100.

As illustrated in FIG. 13, the logical-physical conversion table 1100 includes columns of an SSD LBA 1101, a logical page #1102, a status 1103, a block #1104, and a physical page #1105. Information regarding the logical page specified by the logical page #1102 is stored in each record of the logical-physical conversion table 1100. The LBA (range) on the logical address space that the SSD 21 provides to the storage controller 10 corresponding to the logical page is stored in the SSD LBA 1101. If the SSD 21 receives an access request from the storage controller 10, the SSD 21 uses the SSD LBA 1101 and the logical page #1102 to convert the LBA included in the access request to the logical page #. Information for specifying the physical page mapped to the logical page (that is, the block # and the physical page #) are respectively stored in the block #1104 and the physical page #1105.

Information indicating whether a physical page is mapped to a logical page is stored in the status 1103. In the initial state, the physical page is not mapped to the logical page of the SSD 21. At a time point when a write request is received from the storage controller 10, a physical page is mapped to the logical page being the write target according to the write request. If "allocate" is stored in the status 1103, it shows that the physical page is mapped to the logical page. In contrast, if "unallocated" is stored in the status 1103, it means that the physical page is not mapped to the logical page (at this time, NULL (invalid value) is stored in the block #1104 and the physical page #1105 corresponding to the logical page).

As well known, overwrite to a physical page to which data has been written once is not possible (that is, if overwrite of a physical page is to be performed, the whole block to which the physical page belongs must first be erased). Therefore, in the SSD 21, if an update (overwrite) request to a certain logical page is received from the storage controller 10, update data is stored in a physical page (called a new physical page) that differs from the physical page to which data before update is written (called an old physical page). Then, the block # and the physical page # of the new physical page is stored in the block #1104 and the physical page #1105 corresponding to the logical page being the update target.

FIG. 14 is a view illustrating a configuration of a block management table.

The block management table 1150 is a table for managing the states of a block/physical page. Information related to the physical pages in the SSD 21 is stored in each record of the block management table 1150. The block management table 1150 includes columns of a block #1151, a physical page #1152, a status 1153, an error bit count 1154, a WR time 1155, an elapsed time after WR 1156, and an erase count 1157.

The block #1151, the physical page #1152 and the status 1153 are the same information as the block #1104, the physical page #1105 and the status 1103 in the logical-physical conversion table 1100, respectively. That is, if a certain physical page is allocated to the logical page, the block # and the physical page # of the allocated physical page is stored in the block #1104 and the physical page #1105 in the logical-physical conversion table 1100, and "allocated" is stored in the status 1103. At the same time, "allocated" is also stored in the status 1153 (within the block management table 1105) of the allocated physical page. In the status 1153 of the physical page not allocated to the logical page, "unallocated" or "unused" is stored.

After the physical page has been allocated to the logical page and data write has been performed, there may be a case where the allocation of the physical page to the logical page is cancelled. One example is where the SSD controller 200 performs overwrite to the logical page. In that case, the allocation to the logical page of the physical page having been allocated to the overwrite target logical page is cancelled, and "unallocated" is set in the status 1153.

Meanwhile, "unused" is set in the status 1153 of the physical page not allocated to the logical page and not subjected to write. The physical page whose status 1153 is "unused" is in a state where data write is possible, but the physical page whose status 1153 is "unallocated" is in a state where data write (overwrite) is not possible. In order to set the physical page whose status 1153 is "unallocated" to a state where data write is enabled, it is necessary to erase the block to which the physical page belongs through reclamation processing. The status 1153 of all physical pages within the block being erased is changed to "unused".

The status 1153 in the block management table 1150 may be set to one of the following two states, which are "blockade" and "blockade (reservation)". "Blockade" indicates a state where the relevant block or physical page is in a blocked state and that it is currently not used. "Blockade (reservation)" indicates a state where the relevant block or physical page requires a blockade processing, and that execution of processing is awaited. Specifically, if it is determined according to the FM diagnosis processing described later that the relevant block is close to end of life, the SSD controller 200 changes the status of the relevant block to "blockade (reservation)", and after executing the actual blockade processing, the status is changed to "blockade".

The number of error bits that have occurred during execution of the FM diagnosis processing described later is stored in the error bit count 1154. The details will be described in the description of the FM diagnosis processing. The WR time 1155 stores the latest time in which write (or erase) has been performed to the physical page (hereafter, "WR" means "write"). Further, in the elapsed time after WR 1156, an elapsed time from when write (or erase) has been last performed to the physical page is stored when the FM diagnosis processing described later is executed. The erase count 1157 stores an accumulated number of times of block erase.

The characteristics of the FM will be described with reference to FIGS. 15 and 16.

When storing data to a physical page, the SSD 21 computes an ECC (Error Correcting Code) from the data, and stores the ECC together with the data to the physical page. As a characteristic of the flash memory, after storing data to the physical page, there is a tendency that the error included in the stored data is increased along with the elapse of time. The meaning of "error" used here will be explained briefly. For example, even if the SSD 21 stores "0" in a certain area (one-bit area) on the FM chip, the data content may be changed from "0" to "1" along with the elapse of time. In the present specification, this phenomenon is referred to as "occurrence of error". Further, the one-bit area in which error has occurred (or one-bit data read from the one-bit area in which error has occurred) is called an "error bit". The occurrence of error can be caused, for example, by the area being deteriorated by rewrite performed for many times, or the quality of the area (ability of maintaining the content of stored data) being bad from the beginning. However, ECC is added to the data stored in the physical page, such that even if error is included when reading data, data correction using ECC is enabled if the number of error bits contained in the read target area does not exceed a predetermined number.

The maximum number of bits that is correctable depends on the strength (error correction ability) of the ECC being added. If the data stored in the physical page contains more error bits than the maximum number of bits that is correctable by ECC (called "correction limit threshold"), the reading of that data is disabled. If the data stored in a physical page contains error bits the number of which is equal to or more than a predetermined threshold, the SSD controller 200 moves the data stored in the block including the physical page to a different block. In the present specification, this process is called a "refresh processing". Also, this predetermined threshold is called a "refresh threshold". The refresh threshold is smaller than the correction limit threshold.

In the refresh processing, data is read from a block determined as requiring refresh (called "migration source block"), and the data is written to a different block (called "migration destination block"). When reading data from the migration source block, the error bits are corrected using ECC, and when data is written to the migration destination block, the occurred number of error bits is reset. Thereby, the occurrence of a state where data cannot be read from the SSD 21 (where uncollectable error occurs) can be prevented as much as possible.

Figure 15:
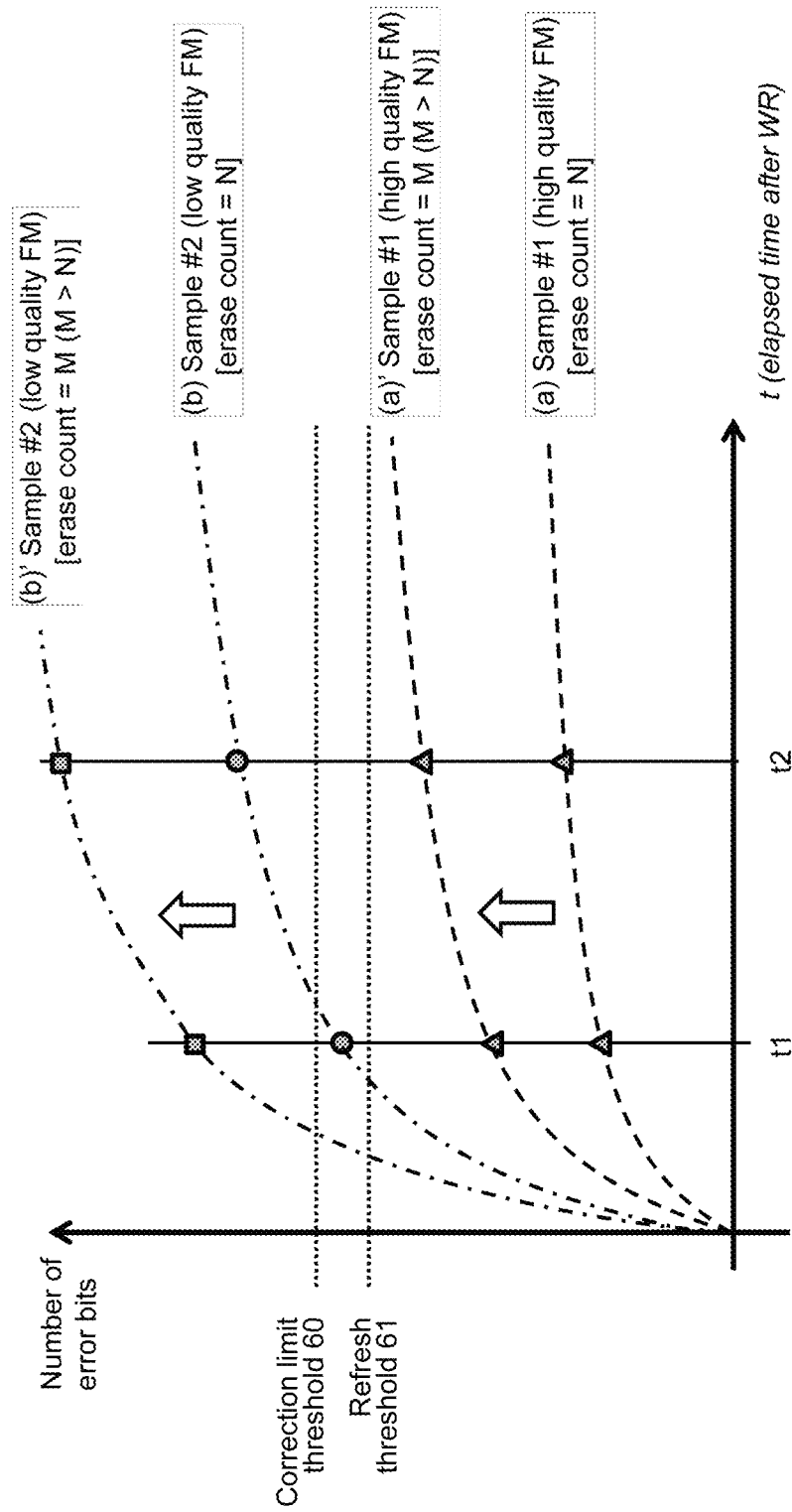
FIG. 15 is a view illustrating a relationship between elapsed time after WR and error bit count.

FIG. 15 is a drawing illustrating the relationship between elapsed time after write and the number of error bits in the FMs.

As a general characteristic of the FM, the number of error bits contained in the data stored in the physical page tends to increase along with the elapsed time after write. FIG. 15 illustrates an example of a graph showing the relationship between the number of error bits contained in the data read from the storage area (such as a physical page) in the FM and the elapsed time after write. The curved line in FIG. 15 is an example of a graph having plotted the number of error bits detected by reading data in each physical page of two FM chips in a state where time t has elapsed after writing data to the pages. The horizontal axis of the graph represents elapsed time after write to the physical page, and the vertical axis represents the number of error bits detected when the physical pages were read (hereinafter called "detected number of error bits").

As can be recognized from FIG. 15, as the elapsed time after write increases, the number of error bits detected during read increases monotonically. However, this characteristic varies depending on the quality of the FM and the erase count.

In FIG. 15, graphs (a) and (a)' illustrated by dotted lines illustrate an example of the characteristic of a high quality FM (temporarily referred to as FM sample #1), and the graphs of (b) and (b)' illustrated by dashed lines illustrate an example of the characteristic of a low quality FM (temporarily called FM sample #2). Graphs (a) and (b) illustrate a state where the erase count is N, and (a)' and (b)' illustrate a state where the erase count has increased to M (M>N).

At first, we will describe the difference of quality. As (a) and (b), both of which are in the state of the same erase count N, are compared, the more error bits have occurred in the low quality FM #2 (b) than the high quality FM #1 (a) at the same elapsed time (t1 or t2). Further, since (a) does not exceed a correction limit threshold 60 and a refresh threshold 61 at both time t1 and time t2, there is low risk of occurrence of an uncorrectable error. Meanwhile, since (b) exceeds the refresh threshold 61 at time t1 and also exceeds the correction limit threshold 60 at time t2, there is a high probability that an uncorrectable error occurs if refresh processing is not performed at time t1.

Next, the influence of erase count will be described. When focusing on (b) and (b)', it can be recognized that the more error bits occurs to (b)' than (b) at time t1. Further, it can be recognized that (b)' exceeds the correction limit threshold 60 and becomes a state of uncorrectable error at time t1.

As described, there is a tendency that the number of detected error bits with respect to the elapsed time after write is generally high (that is, error characteristic is bad) in poor quality FM chips, whereas the number of detected error bits with respect to the elapsed time after write is small (that is, error characteristic is good) in high quality FM chips. Further, as for the erase count of blocks, the error characteristic tends to deteriorate as the erase count increases.

Next, the relationship between the erase count and the number of error bits of the FM will be described. FIG. 16 is an example of a graph showing the relationship between the number of error bits detected when the physical page of the FM was read, and the erase count of the block to which the physical page belongs.

The horizontal axis of the graph represents the erase count of the block, and the vertical axis represents the detected number of error bits. A life threshold 61' is a threshold based on which the SSD controller 200 determines that a block has reached its end of life, and it is equal to the correction limit threshold 60. Further, a blockade threshold 62' is a threshold based on which the SSD controller 200 determines that the relevant block is close to its end of life, and the block having exceeded this threshold will be blocked. According to the SSD 21 of the present embodiment, the refresh threshold 61 and the blockade threshold 62' are equal.

The graph (c) shown by the dotted line illustrates an example of the characteristic of the FM sample #1 which is a high quality FM, and the graph (d) shown by the dashed line illustrates an example of the characteristic of the FM sample #2 which is a low quality FM. As described, it can be recognized that the actual erase count is deteriorated in the low quality FM compared to the high quality FM. In other words, the low quality FM (d) reaches its end of life when erased N times, but the high quality FM (c) can be erased M times (M>N).

The FM chips whose characteristics were grasped in advance are used for the SSD 21 according to the present embodiment. However, even if respective FM chips (or blocks or dies) are of the same type of FM chips (having the same model number), they do not have the same characteristics, and there is a dispersion of characteristics in the respective FM chips (or blocks or dies). Therefore, the SSD 21 according to the present embodiment retains characteristic information collected for some FM chips at the time of fabrication (or at the time of shipping). Specifically, the developer/manufacturer of the SSD 21 according to the present embodiment selects some FM chips each of which has different qualities among the chips of the same type (having the same model number) as the FM chip used for the SSD 21, and measures the characteristics (such as the relationship of the number of error bits, elapsed time after WR and erase count) of the selected FM chips in advance (hereafter, the FM chips selected here are called "sample FMs"). Then, the characteristic information of the sample FM measured in advance is stored in the FM error characteristic table 1200 and the FM life characteristic table 1400 of the respective SSDs 21. When operation is started (when I/O from the storage controller 10 is started), the SSD 21 compares the number of detected error bits and the information in the FM error characteristic table 1200 to judge which sample FM evaluated in advance has the characteristic close to the characteristic of each block, and estimates the quality of each block. Further, the level of deterioration of the block can be grasped and the remaining life can be estimated based on the estimated quality of the block and the information in the FM life characteristic table 1400.

FIG. 17 is a view illustrating a configuration of an FM error bit characteristic table.

The FM error characteristic table 1200 is a table retaining information corresponding to the graph of FIG. 15, and it includes columns of a block erase count 1201, a sample #1202, and columns 1203 through 1205 storing the error bit counts with respect to elapsed time after WR. The block erase count 1201 indicates the erase count of the block. The sample #1202 indicates the identification number (sample number) of characteristic information of the sample FM retained in the SSD 21. The view indicates that N sample data from #1 to #N are retained. The value of the sample #1202 indicates that 1 is the sample FM having the highest quality and that N is the sample FM having the lowest quality. The error bit count 1203 indicates the number of error bits that have occurred in each sample FM when data is read from a physical page whose elapsed time after WR is between 0 and 1 second. Similarly, the error bit count 1204 indicates the number of error bits that has occurred in each sample FM whose elapsed time after WR is between 1 and k seconds, and the error bit count 1205 indicates the number of error bits that has occurred in each sample FM whose elapsed time after WR is k seconds or greater. The unit of elapsed time after WR in 1203 through 1205 is not restricted to seconds.

In FIG. 17, the erase count and the elapsed time after WR are used as parameters of the error characteristics, but there are other causes that influence the occurred number of error bits. For example, the occurred number of error bits may differ depending on the temperature of the FM chip, the page type (MSB page or LSB page), or parameters for instructing read, write or erase of data to the FM (such as the designation of low speed/high speed mode for accessing page (based on which the chip busy time is changed) or the read voltage while reading page). Therefore, as another embodiment, the relationship between the detected number of error bits and these information (such as the FM chip temperature, page type, and parameters for instructing reading, writing or deleting of data to the FM) may be added to the FM error characteristic table 1200.

FIG. 18 is a view illustrating a configuration of an FM life characteristic table.

Figure 16:
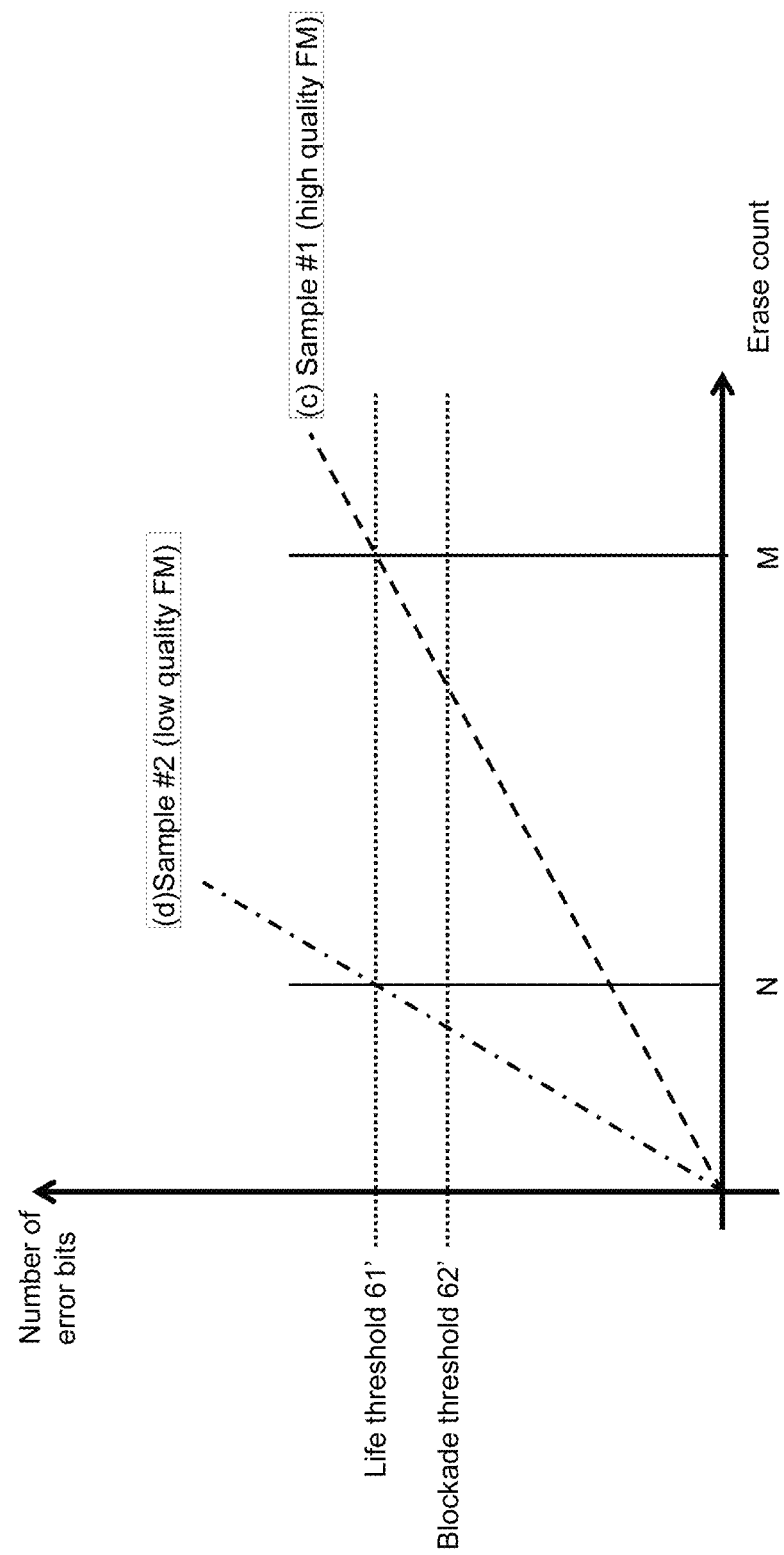
FIG. 16 is a view illustrating a relationship between block erase count and error bit count.

The FM life characteristic table is a table retaining information corresponding to the graph of FIG. 16, and includes columns of a sample #1401, a life determination threshold 1402, and a blockade determination threshold 1403. The sample #1401 indicates the sample number of the characteristic information of the sample FM retained in the SSD 21, and it corresponds to the sample #1202 of the FM error characteristic table 1200. The life determination threshold 1402 is a block erase count of a block in each sample FM when the block reached its end of life. In other words, it is an erase count of the block of which the occurred number of error bits reached the life threshold 61' in FIG. 16 when a physical page in the block was read. The blockade determination threshold 1403 is the erase count of determining that blockade processing of a block is required in each sample, in other words, it is an erase count of the block of which the occurred number of error bits reached the blockade threshold 62' in FIG. 16 when a physical page in the block was read.

The flow of the respective processes will be described hereafter.

Figure 19:
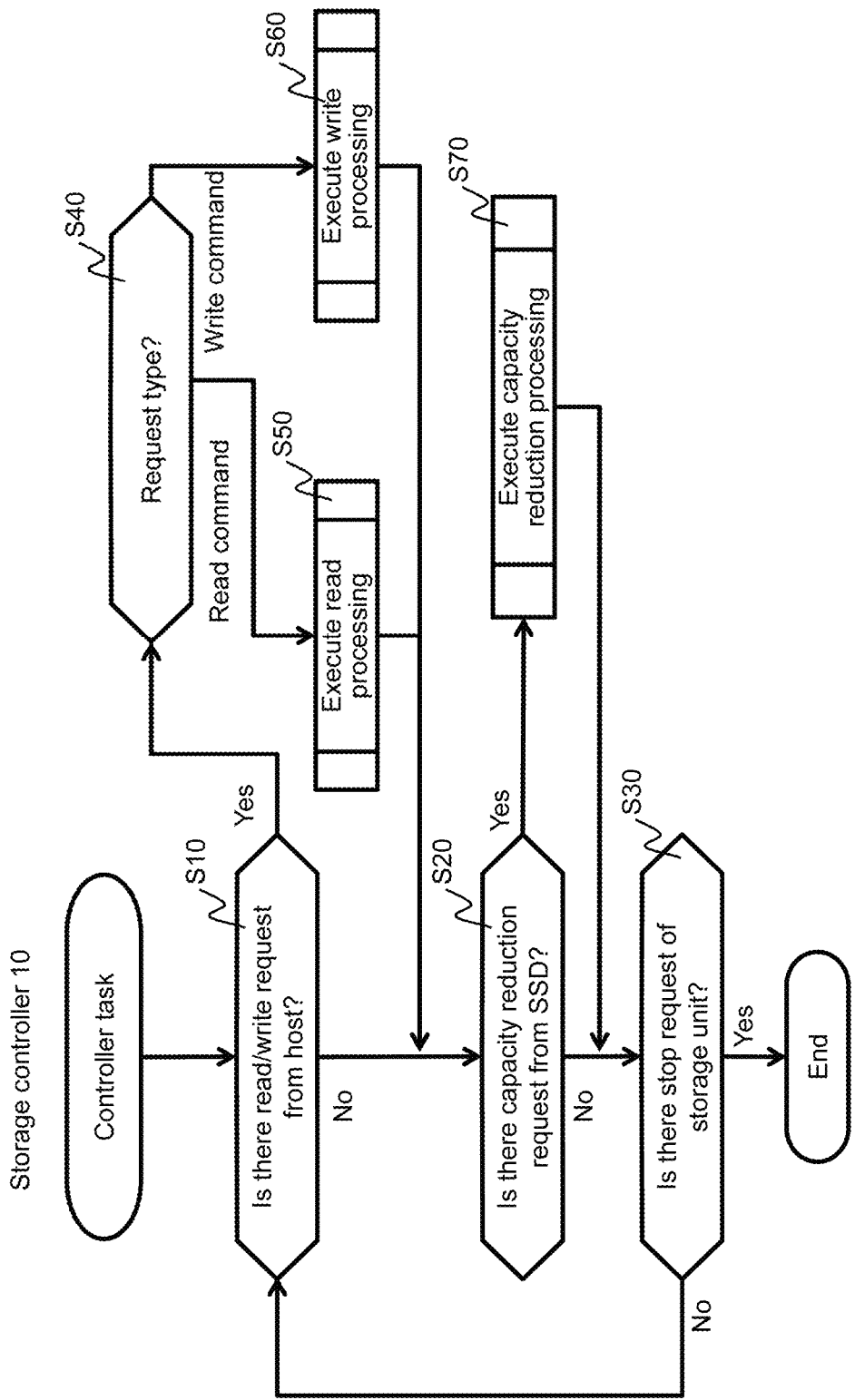
FIG. 19 is a flowchart of a storage controller task.

FIG. 19 is a flowchart of a storage controller task. A CPU 11 of the storage controller 10 executes this storage controller task periodically. In the following description, the respective processes are described with the storage controller 10 set as the subject, but unless stated otherwise, it means that the respective processes are executed by the CPU 11.

The storage controller 10 judges whether a read request or a write request has been received from the host computer 2 (S10). If no request has been received (S10: No), the storage controller 10 moves on to S20.

If a read or a write request has been received (S10: Yes), the storage controller 10 judges whether the request is a read command or a write command (S40). If this request is a read command (S40: read command), the storage controller 10 executes a read processing (S50). If this request is a write command (S40: write command), the storage controller 10 executes a write processing (S60). The details of the read processing and the write processing will be described later (refer to FIGS. 21 and 20). Further, the storage controller 10 performs the process of S20 after performing the process of S50 or S60.

In S20, the storage controller 10 judges whether a capacity reduction request from the SSD 21 has been received or not (S20). If it is determined that there is no capacity reduction request (S20: No), the storage controller 10 performs the process of S30 next. If it is determined that a capacity reduction request exists (S20: Yes), the storage controller 10 executes the capacity reduction processing (S70), and thereafter, performs the process of S30. The details of the capacity reduction processing will be described later (refer to FIG. 25).

In S30, the storage controller 10 judges whether a stop request of the storage unit 1 has been received already (S30). The stop request of the storage unit 1 is notified from the management host 5 by the user issuing a stop instruction using the management host 5.

If a stop request is already received (S30: Yes), the storage controller 10 executes a stop processing of the storage unit 1, and ends the processing. If a stop request is not yet received (S30: No), the storage controller 10 repeats the processing from S10.

Figure 20:
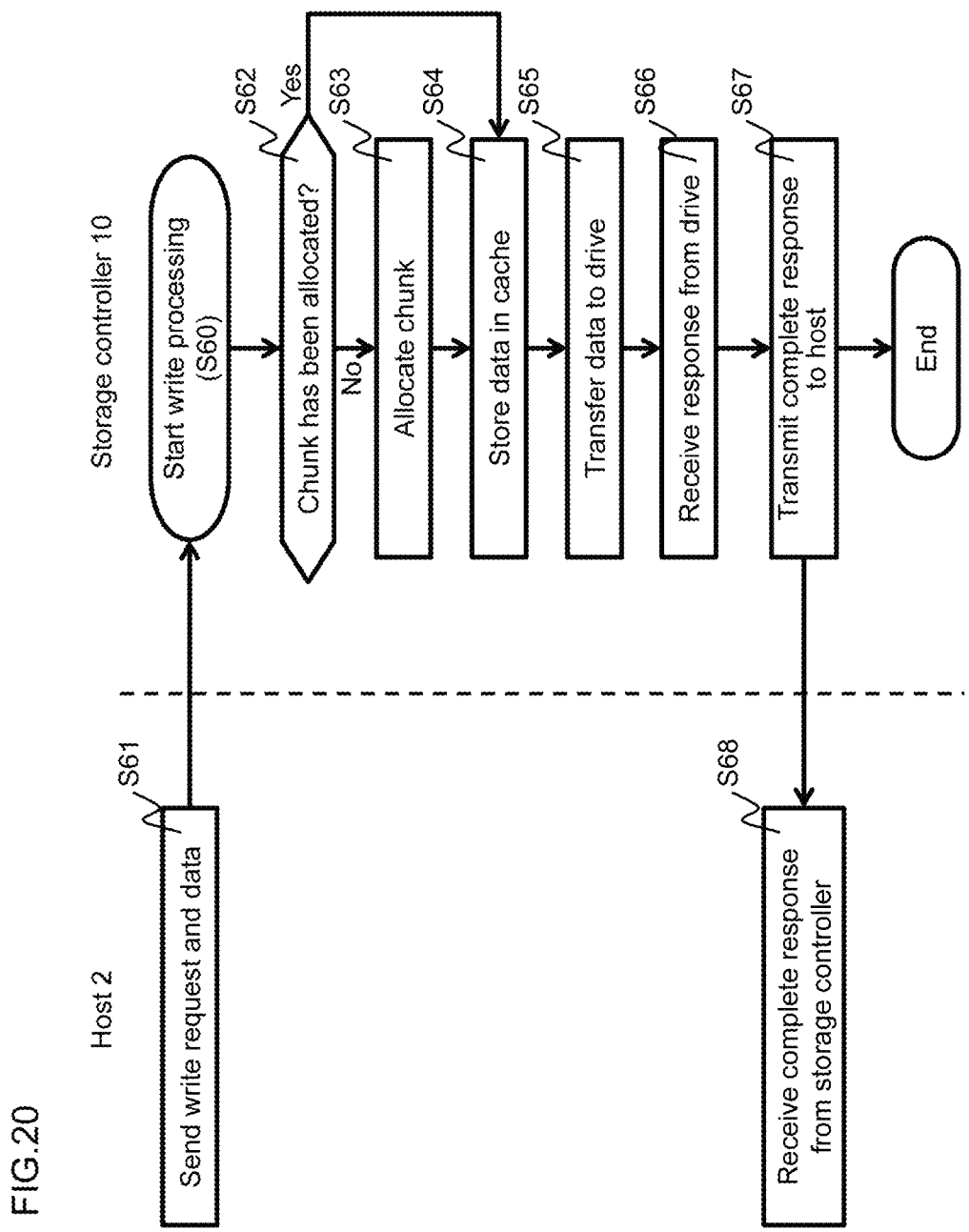
FIG. 20 is a flowchart of data write processing of a storage controller.

FIG. 20 is a flowchart of the write processing of the storage controller. The processing corresponds to S60 of FIG. 19.

The host 2 transmits a write request and write data to the storage controller 10 (S61). When the storage controller 10 receives a write request from the host 2, it judges whether a chunk is already allocated to the virtual chunk including the write destination address of the virtual volume designated in the write request by referring to the virtual volume management table 500 and the pool management table 550 (S62).

If a chunk is not allocated to the write destination virtual chunk (S62: No), the storage controller 10 selects a chunk (unused chunk) whose status 555 is "unallocated" from the pool management table 550, and allocates the selected unused chunk to the write destination virtual chunk. Then, the storage controller 10 updates the contents of the virtual volume management table 500 and the pool management table 550 (S63). If a chunk is already allocated to the write destination virtual chunk (S62: Yes), the storage controller 10 will not execute S63.

After S62 and S63, the storage controller 10 stores the write data to the cache (S64), and transmits the write command and write data to the write destination storage device (S65). Here, it is necessary to perform a process to convert the address designated in the write request to the write destination storage device and the address in the write destination SSD 21, but this process is similar to the address conversion performed in conventional storage units, so that the description thereof will be omitted. The storage controller 10 receives a write complete notice from the write destination storage device (S66). The storage controller 10 transmits a complete response of the write request to the host 2 (S67). The host 2 receives a complete response to the write request from the storage controller 10 (S68), and ends the process.

Figure 21:
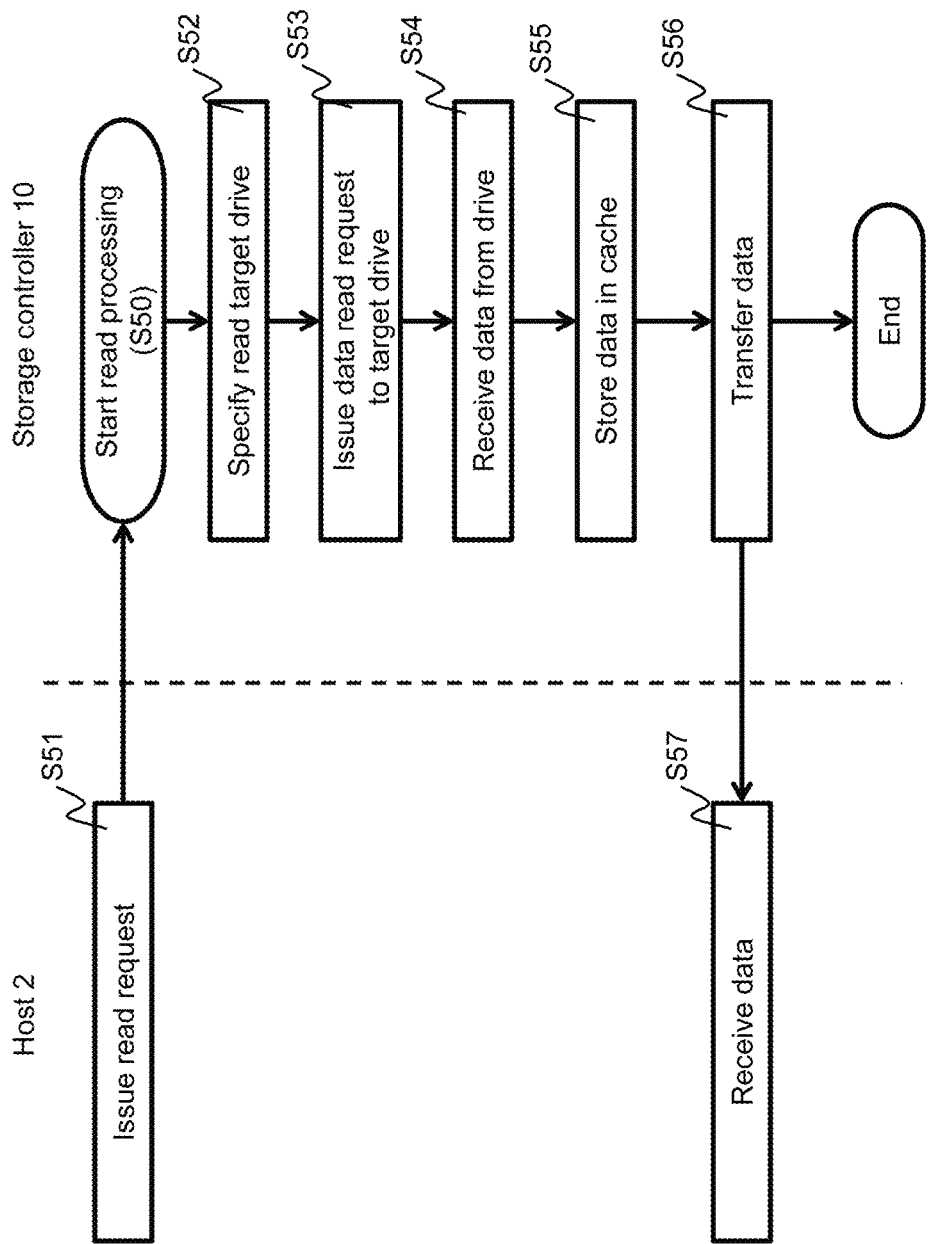
FIG. 21 is a flowchart of data read processing of a storage controller.

FIG. 21 is a flowchart of data read processing of the storage controller. This processing corresponds to S50 of FIG. 19. The host 2 transmits a read request to the storage controller 10 (S51). When the storage controller 10 receives a read request from the host 2, it specifies the virtual chunk including the virtual volume address designated in the read request. Further, the storage controller 10 uses the virtual volume management table 500 to specify the chunk allocated to the virtual chunk, and using the pool management table 550 and the RAID group management table 650, specifies the read destination storage device among the storage devices configuring the chunk (S52). The storage controller 10 transmits a read command to the specified storage device (S53).

After S53, the storage controller 10 receives the read data from the storage device (S54), and stores the read data in the cache (S55). The storage controller 10 transmits the complete response and read data corresponding to the read request to the host 2 (S56). The host 2 receives the complete response and read data from the storage controller 10 (S57), and ends the process.

Figure 22:
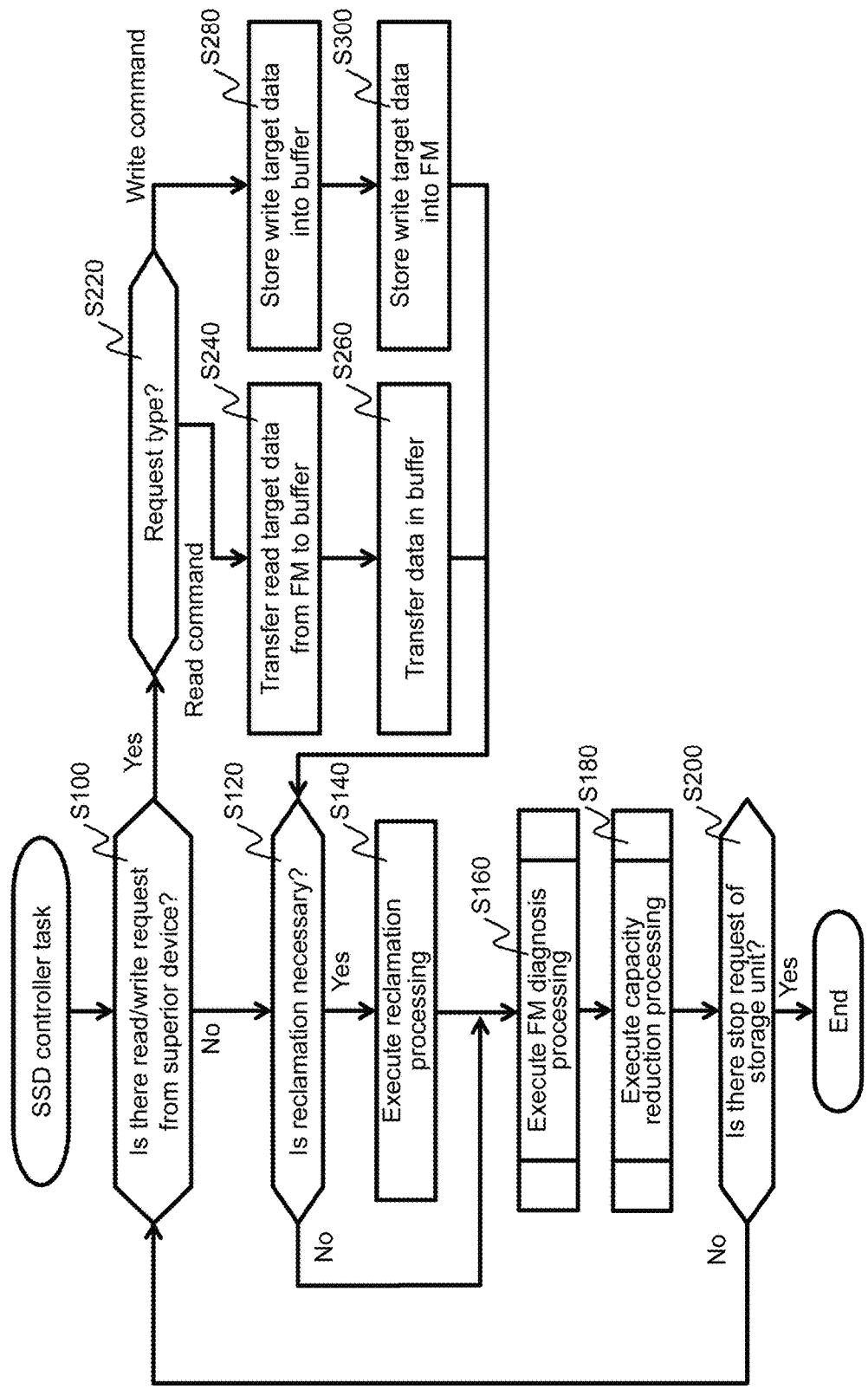
FIG. 22 is a flowchart of an SSD controller task.

FIG. 22 is a flowchart of an SSD controller task. The CPU 201 in the SSD controller 200 executes the SSD controller task periodically. In the following description, the respective processes are described with the SSD controller 200 as the subject, but unless stated otherwise, it means that the respective processes are executed by the CPU 201.

The SSD controller 200 judges whether read or write request have been received from the storage controller 10 serving as an upper-level device (S100). If a request has not been received (S100: No), the SSD controller 200 advances to S120. If a request from the upper-level device has been received (S100: Yes), the SSD controller 200 judges the contents of the request (S220).

If this request is a read command (S220: read command), the SSD controller 200 transfers data to a buffer from a physical page storing the read target data based on the information in the logical-physical conversion table 1100 (S240), and thereafter, transfers the data stored in the buffer and a notice (response) of completion of processing regarding the read command to the upper-level device (S260). Thereafter, the SSD controller 200 advances to S120. If this request is a write command (S220: write command), the SSD controller 200 first stores the write target data in the buffer (S280), and thereafter, specifies an unused physical page (a physical page whose status 1153 is "unused") based on the information in the block management table 1150, stores the data stored in the buffer to the specified physical page, and returns a complete notice (response) of processing regarding the write command to the upper-level device (S300). The SSD controller 200 also updates the contents of the logical-physical conversion table 1100. Further, the SSD controller 200 changes the status 1153 of the physical page having stored the data in the current process among the physical pages managed by the block management table 1150 to "allocated", and stores current time (time when S300 was executed) in the WR time 1155 (in the block management table 1150). The SSD controller 200 changes the status 1153 of the physical page that had been mapped to the logical page to "unallocated". Then, the SSD controller 200 executes the processing of S120 and thereafter.

In S120, the SSD controller 200 judges whether a reclamation processing is necessary or not (S120). If there is no need to perform the reclamation processing (S120: No), the SSD controller 200 advances to S160. If there is a need to perform reclamation processing (S120: Yes), the SSD controller 200 executes the reclamation processing (S140). One is added to the erase count 1157 of the block having been erased by the reclamation processing. Further, the reclamation is performed when unused physical pages (or blocks) start to be insufficient. Therefore, in S120, the SSD controller 200 judges whether reclamation processing is necessary by judging whether the number of unused physical pages (or blocks) has fallen below a predetermined number.

Figure 23:
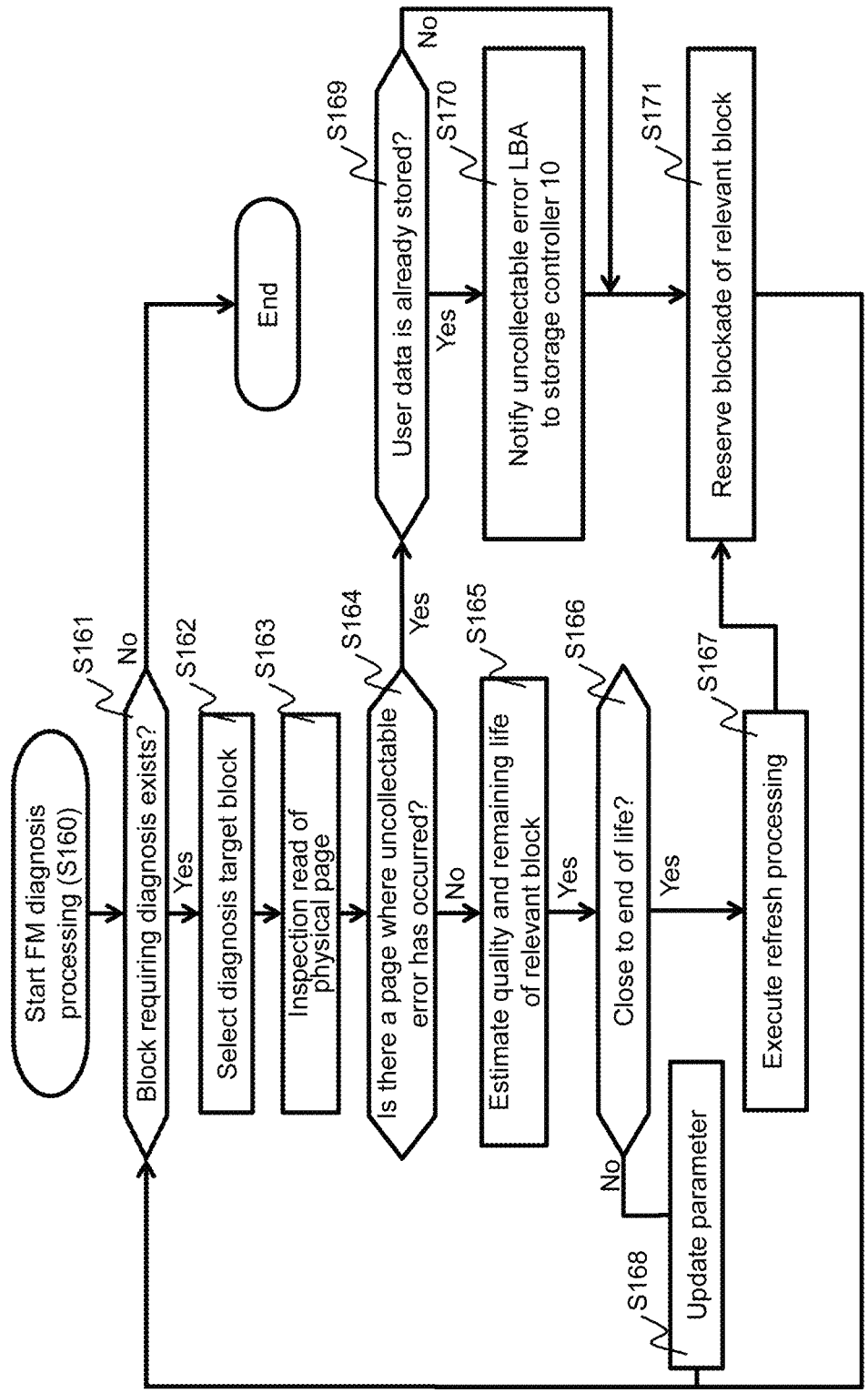
FIG. 23 is a flowchart of FM diagnosis processing.
Figure 24:
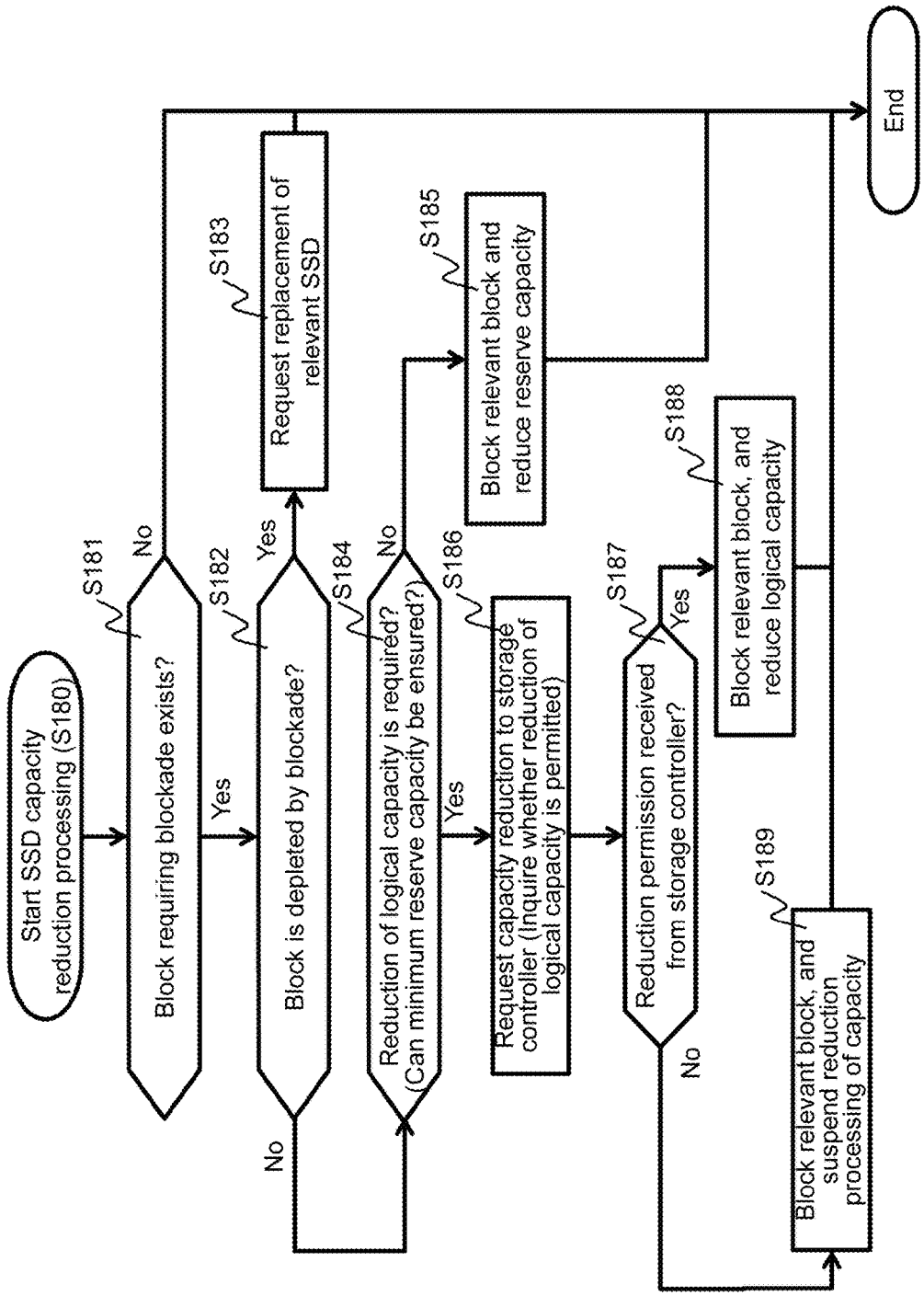
FIG. 24 is a flowchart of capacity reduction processing of the SSD controller.

In S160, the SSD controller 200 executes an FM diagnosis processing (S160). The details of the FM diagnosis processing will be described later (FIG. 23). In S180, the SSD controller 200 executes the capacity reduction processing (S180). The capacity reduction processing will be described later (FIG. 24).

In S200, the SSD controller 200 judges whether a stop request of the SSD 21 has been received or not (S200). The stop request of the SSD 21 is notified from the storage controller 10. For example, if the storage controller 10 receives a stop request of the storage unit 1 from the management host 5, the storage controller 10 issues a stop request to each SSD 21. If a stop request is already received (S200: Yes), the SSD controller 200 executes a stop processing of the SSD 21, and ends the processing. If a stop request is not yet received (S200: No), the SSD controller 200 repeats the processing from S100.

Based on the above-described processing, the SSD 21 can store the write data transmitted from the storage controller 10 or read the read data. Further, it can monitor the status of the FM chips 210, and execute reduction processing of capacity according to the result.

FIG. 23 is a flowchart of FM diagnosis processing (S160 in FIG. 22).

The SSD controller 200 judges whether block(s) requiring diagnosis exist (S161). For example, the controller 200 may determine that block(s) requiring diagnosis exist if a predetermined time elapsed after the FM diagnosis processing had been executed previously. In another example, it is possible to determine that block(s) requiring diagnosis exist when a specific command such as instruction to execute diagnosis is received from the storage controller 10. Furthermore, it is possible to determine that block(s) requiring diagnosis exist when a specific event occurs, such as when block(s) (or page(s)) whose block erase count or access count has reached N.

If it is determined that diagnosis is not necessary (S161: No), the SSD controller 200 ends the processing. If it is determined that diagnosis is necessary (S161: Yes), the SSD controller 200 selects a block requiring diagnosis one by one, and repeatedly execute the processing of S162 and thereafter for each block. In S162, the SSD controller 200 selects the diagnosis target block (S162), and reads the data of the physical page in the diagnosis target block (S163). The read processing of the physical page performed in S163 is called "inspection read". In S163, all physical pages can be read, but only a part of the pages may be read. If only a part of the pages is read, for example, it is possible to read only the physical pages storing data (physical pages having the status 1153 set to "allocated"), or to read only specific pages, such as the physical page number being even numbers or odd numbers. Further, during the inspection read process, the CPU 201 is notified of information regarding the number of error bits that occurred in the physical page subjected to inspection read, and whether uncorrectable error has occurred or not, from the downstream I/F 203.

In S164, the SSD controller 200 judges whether there exists a physical page where uncorrectable error occurred by inspection read of S163. Uncorrectable error may occur by causes such as accidental failure of hardware. If there exists a physical page where uncorrectable error occurred (S164: Yes), the SSD controller 200 executes S169. In S169, the SSD controller 200 judges, by referring to the logical-physical conversion table 1100, whether the physical page is mapped to the logical page, that is, whether user data is already stored in the physical page (S169).

If user data is not yet stored (S169: No), the processing of S170 will not be performed. If user data is already stored in S169 (S169: Yes), the SSD controller 200 notifies the logical page address (SSD LBA 1101) mapped to the physical page to which uncorrectable error has occurred to the storage controller 10 (S170).

In S170, if there is a physical page mapped to the logical page in the block including the physical page where uncorrectable error occurred, the SSD controller 200 migrates the data in the physical page to an unused physical page in a different block, and updates the logical-physical conversion table 1100 and the block management table 1150. However, at this time, data migration is not performed for the physical page where uncorrectable error occurred. The storage controller 10 having been notified the address of the logical page where uncorrectable error occurred executes rebuild processing by RAID technique to recover the data in the logical page, and rewrites the recovered data to the logical page.

After S170, the SSD controller 200 performs the processing of S171. The processing of S171 will be described later.

In S164, if there is no physical page where uncorrectable error occurred (S164: No), the SSD controller 200 executes the processing of S165 and thereafter. In S165, the SSD controller 200 estimates the quality of the relevant block and the deterioration level based on statistical information such as the number of error bits having occurred in the inspected physical page, the elapsed time after data write of the physical page, and erase count of the block to which the physical page belongs, and information stored in the FM error characteristic table 1200 and the FM life characteristic table 1400 retained in the memory 204 (S165).

The method for estimating the quality of the block and the deterioration level will be described. At first, the SSD controller 200 refers to the block management table 1150 to compute the elapsed time after write based on the WR time 1155 of the inspected physical page and the current time. Thereafter, the SSD controller 200 specifies the erase count 1157 of the block to which the inspected physical page belongs. Next, the SSD controller 200 judges which sample data stored in the FM error characteristic table 1200 is closest to the characteristic of the inspected physical page (or the block to which the page belongs) based on the erase count of the block, the elapsed time after write, and the number of error bits of the physical page. For example, if the elapsed time after write of the inspected physical page is 0.5 seconds, the number of error bits is 20, and the erase count of the block to which the physical page belongs is 1, the characteristic of the physical page (or the block to which the page belongs) is closest to a sample data whose sample #1202 is "2". Therefore, in this case, the SSD controller 200 estimates that the inspected physical page has a quality (characteristic) similar to the sample FM whose sample #1202 is "2". In S163, if the plurality of physical pages were inspected, for example, the quality of the FM may be estimated using the worst value or an average value of the number of error bits.

Thereafter, the SSD controller 200 refers to the FM life characteristic table 1400, and computes the deterioration level based on the blockade determination threshold 1403 of the row whose value of the sample #1401 is the same as the sample #1202 specified earlier, and the erase count of the block to which the inspected physical page belongs. In the present embodiment, the deterioration level is a value computed by:

$$\text{erase count of block to which inspected physical page belongs} \div \text{blockade determination threshold 1403}$$

Then, based on the result of S165, the SSD controller 200 judges whether deterioration of the inspected block has advanced and the block is close to end of life (S166). A state of a block close to end of life is a state in which the deterioration level of the inspected block exceeds 1, that is, where the erase count of the inspected block has exceeded the blockade determination threshold 1403. In S166, if it is determined that the relevant block is not close to end of life (deterioration level is 1 or smaller) (S166: No), the SSD controller 200 updates parameters such as the error bit count 1154 and the elapsed time after WR 1156 in the block management table 1150 (S168), and returns to S161. If it is determined in S166 that the relevant block is close to end of life (S166: Yes), the SSD controller 200 performs refresh processing of data of the relevant block (S167). Accompanying the refresh processing, the data stored in the relevant block is migrated to a different block. If there is a physical page mapped to the logical page among the physical pages in the relevant block, the SSD controller 200 updates the contents of the logical-physical conversion table 1100 and the block management table 1150 such that the data migration destination physical page is mapped to the logical page.

In S171, the SSD controller 200 reserves a blockade processing of a block to the block including the physical page(s) in which uncorrectable error occurred in S164, or the block determined to be close to end of life in S166. Specifically, the SSD controller 200 changes the status 1153 of the block management table 1150 to "blockade (reservation)" of the block being the target of blockade. In the SSD 21 according to the present embodiment, blockade is performed in block units. Therefore, if a physical page in which uncorrectable error occurred is detected in S164, the status 1153 of all physical pages in the block including the relevant physical page is changed to "blockade (reservation)". Further, the actual blockade processing is performed in the capacity reduction processing (FIG. 24) described later.

After executing the process of S171, the SSD controller 200 repeats the processing from S161 again. This processing is executed until there is no more block requiring diagnosis.

FIG. 24 is a flowchart of capacity reduction processing of the SSD controller. In the following description, an example is illustrated of a case where if the logical space of the SSD 21 is reduced, suspension of use is performed in order starting from end area of the logical address space of the SSD 21. For example, if D pages are reduced from the logical capacity of the SSD 21, an area corresponding to D pages from the end area of the logical address space is suspended of use. The meaning of "suspended of use" is to cancel mapping of a physical page when the physical page is mapped to the logical page being the target of suspension of use.

At first, the SSD controller 200 checks whether there is a block requiring blockade (S181). This is done by checking whether there is a block whose status 1153 of the block management table 1150 is "blockade (reservation)".

If it is determined that there is no block requiring blockade in S181 (S181: No), the SSD controller 200 ends the process. If it is determined that there is a block requiring blockade (S181: Yes), the SSD controller 200 performs the processing of S182. In S182, the SSD controller 200 judges whether the blocks will be depleted or not by the blockade of the relevant block (S182). For example, a state in which blocks are depleted is a state where the reserve capacity is already reduced to a minimum reserve capacity (such as the state in FIG. 4(c)), and the logical capacity will completely be reduced to zero if any more blocks are subjected to blockade, or if the remaining amount of the logical capacity falls below a specific threshold.

If it is determined in S182 that the blocks will be depleted (S182; Yes), the SSD controller 200 determines that further reduction of capacity is difficult, and notifies the storage controller 10 that replacement of the relevant SSD is required (S183). The storage controller 10 having received the notice prompts the user (administrator) of the storage unit 1 to replace the relevant SSD by outputting a message stating that replacement of the SSD 21 is required and the information such as the identifier of the replacement target SSD 21 on the screen of the management host 5. Thereafter, the SSD controller 200 ends the processing. Meanwhile, if it is determined that the blocks will not be depleted in S182 (S182: No), the SSD controller 200 determines that blockade of a block is possible, and performs the processing of S184 and thereafter.

In S184, the SSD controller 200 judges whether reduction of the logical capacity is necessary (in other words, whether the reserve capacity has already reached the minimum reserve capacity) based on the information of the configuration information management table 1300 (S184). If it is determined in S184 that reduction of a logical capacity is not necessary (that is, that the reserve capacity has not reached the minimum reserve capacity) (S184: No), the SSD controller 200 blocks the relevant block(s), and executes reduction of the reserve capacity (S185). In S185, the status 1153 of the block(s) where blockade was reserved in S171 is changed from "blockade (reservation)" to "blockade". In the following description, the block(s) whose status 1153 is changed to "blockade" in S185 (or S188) is/are called blockade target block(s). Further, in S185, the total size of the blockade target block(s) is subtracted from the reserve capacity 1303, and the total size of the blockade target block(s) is added to the blocked capacity 1304. Thereafter, the SSD controller 200 ends the processing.

In S184, if it is determined that reduction of the logical capacity is required (that is, if the reserve capacity has already reached the minimum reserve capacity) (S184: Yes), the SSD controller 200 notifies a capacity reduction request to the storage controller 10 (S186). At this time, the SSD controller 200 notifies to the storage controller 10 of the planned size of the changed logical capacity (value subtracted the total size of the blockade target block(s) from the current logical capacity) or the range of the LBA where the use is restricted. As mentioned in the description of FIG. 19, the storage controller 10 having received the capacity reduction request judges the propriety by executing the processing illustrated in FIG. 25, and returns a message including the judged result to the SSD controller 200. The SSD controller 200 waits for the message to be returned from the storage controller 10.

The SSD controller 200 having received the message from the storage controller 10 judges the propriety of executing of logical capacity reduction in S187 (S187). In S187, if a reduction OK message is received from the storage controller 10 (S187: Yes), the SSD controller 200 blocks the blockade target block(s), and executes the reduction processing of the logical capacity (S188). The processing of S188 is similar to S185, but the point that the logical capacity 1302 is subtracted instead of the reserve capacity 1303 differs from the process performed in S185. The amount being subtracted from the logical capacity 1302 is the total size of the blockade target block(s).

Along with the reduction of logical capacity, (one or more) block(s) at the end of the logical address space can no longer be used. Therefore, the SSD controller 200 changes the state of some part of the logical pages having exceeded the logical capacity among the logical pages managed by the logical-physical conversion table 1100 to a state where a physical page is not mapped. For example, if the logical capacity after the reduction of logical capacity becomes K pages, the SSD controller 200 changes the status 1103 of the logical pages whose logical page #1101 in the logical-physical conversion table 1100 is greater than K to "unallocated", and changes the block #1104 and the physical page #1105 to NULL. Further, if a physical page is mapped to the logical page whose status 1103 has been changed to "unallocated", the SSD controller 200 changes the status 1153 in the block management table 1150 to "unallocated" regarding the physical page. Thereafter, the SSD controller 200 ends the processing.

In S187, if a reduction NG message is received from the storage controller 10 (S187: No), the SSD controller 200 suspends blockade of the relevant block and reduction processing of the logical capacity (S189), and ends the processing.

Figure 25:
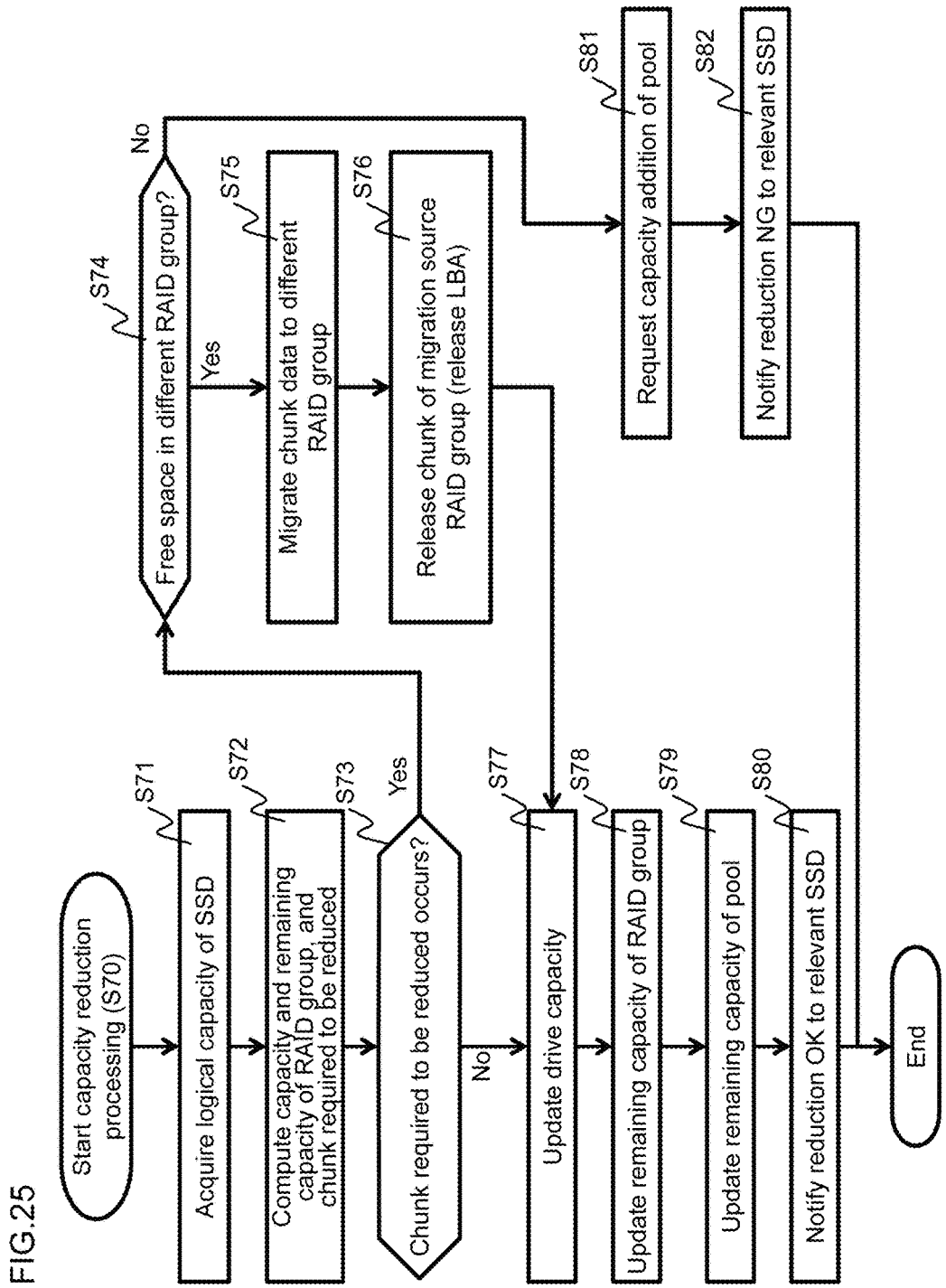
FIG. 25 is a flowchart of capacity reduction processing of a storage controller.

FIG. 25 is a flowchart of the capacity reduction processing performed in the storage controller 10. This processing is executed when a capacity reduction request is received from the SSD 21 (S20: Yes in FIG. 19). The capacity reduction request notified by the SSD 21 according to the first embodiment includes information of the logical capacity when the logical capacity reduction is to be performed. The logical capacity when logical capacity reduction is to be performed is, as mentioned earlier, a value having subtracted the total size of the blockade target block(s) from the current logical capacity of the SSD 21. In the following description, this amount is called "logical capacity after reduction".

In the present embodiment, if n pages are reduced from the logical capacity of the SSD 21, an example is illustrated where n pages are suspended of use from the end of the logical address space of the SSD 21. The same applies for the RAID group, and suspension of use is set sequentially from the end area of the RAID group.

At first, the storage controller 10 acquires the logical capacity after reduction of the SSD 21 having notified the capacity reduction request (S71). Hereafter, the SSD 21 having notified the capacity reduction request is called a "target SSD". Next, the storage controller 10 computes a capacity and remaining capacity of the RAID group to which the target SSD belongs and the number of chunks which will be unavailable (the number of chunks that can no longer be allocated to the virtual chunk) based on the logical capacity after reduction (S72). In the following description, the RAID group to which the target SSD belongs is called "target RAID group".

The capacity of the RAID group is calculated by multiplying the logical capacity of the SSD 21 having the minimum logical capacity among the SSDs 21 configuring the RAID group by N (N being the number of SSDs 21 configuring the RAID group). Further, the number of available chunks in the RAID group can be calculated by dividing the capacity of the RAID group by the size of a chunk (in the following description, the number of available chunks in the target RAID group after reduction of the logical capacity of the target SSD is denoted as "C"). The storage controller 10 can acquire the number of chunks that must be reduced (the number of chunks that can no longer be allocated to the virtual chunk) by calculating the difference between the number of chunks defined in the current target RAID group and C. The number of chunks that can no longer be allocated to the virtual chunk is denoted as D.

Further, chunks that can no longer be allocated to the virtual chunk can be obtained using the number of chunks (D) that can no longer be allocated to the virtual chunk. If chunks whose chunk #553 of the target RAID group is 1 through k were in an available state (status 555 of the chunk is either "allocated" or "unallocated") prior to reducing the logical capacity, the chunks whose chunk #553 are (k−(D−

1)) through k are the chunks that can no longer be allocated to the virtual chunk. In the following description, the chunk(s) is/are called "migration target chunk(s)".

In S73, the storage controller 10 judges whether there is a chunk that can no longer be allocated to the virtual chunk. If it is determined in S73 that there is a chunk that can no longer be allocated to the virtual chunk (S73: Yes), the storage controller 10 advances to S74, and judges whether there is sufficient remaining capacity (whether there is a remaining capacity equal to or greater than a predetermined threshold, such as whether there is a remaining capacity equal to or more than the migration target chunk(s)) in a different RAID group residing in the same pool where the target RAID group resides (S74).

If it is determined in S74 that there is no sufficient remaining capacity in the different RAID groups (S74: No), the storage controller 10 requests the user to add capacity to the pool (S81). Specifically, the storage controller 10 prompts the user (administrator) of the storage unit 1 to add a RAID group by outputting a message notifying the need to add a new RAID group to the pool on a screen of the management host 5. Thereafter, the storage controller 10 advances to S82, and transmits a reduction NG message to the SSD 21 having notified the reduction request of the logical capacity (S82). Thereafter, the storage controller 10 ends the processing.

Meanwhile, if the storage controller 10 determines in S74 that a sufficient remaining capacity exists in a different RAID group residing in the same pool where the target RAID group resides (S74: Yes), the storage controller 10 reads the data from the migration target chunk, and migrates the data to an unused chunk of a different RAID group (this chunk is called "migration destination chunk") (S75). If the migration target chunk has been mapped to a virtual chunk, the storage controller 10 simultaneously updates the content of the virtual volume management table 500 so that the migration destination chunk is mapped to the virtual chunk. The RAID level 654 of the RAID group to which the migration target chunk belongs and the RAID level 654 of the RAID group to which the migration destination chunk belongs can be the same or different. If the RAID level 654 of the two groups differ, recalculation of parity and the like becomes necessary when migrating data.

Thereafter, the storage controller 10 releases the storage area used by the migration target chunk. Specifically, the storage controller 10 changes the status 555 of the migration target chunk in the pool management table 550 to "non-allocatable" (S76). Thereafter, the storage controller 10 advances to S78.

After completing S76, or if it is determined in S73 that there is no chunk that can no longer be allocated to the virtual chunk (S73: No), the storage controller 10 updates the drive capacity 655 of the target SSD to the logical capacity acquired in S71 (S77). Further, the storage controller 10 updates the RAID group remaining capacity 656 to the value calculated in S72 (S78). Thereafter, the storage controller 10 changes the status 555 of the chunk that can no longer be allocated to the virtual chunk to "non-allocatable", updates the remaining capacity of pool 556 (S79), and transmits a reduction OK message to the SSD 21 having notified the logical capacity reduction request (S80). Then, the storage controller 10 ends the processing.

As described above, the storage unit 1 according to the first embodiment detects a block close to end of life, migrates the data in the block to a different block before uncorrectable error occurs, and performs capacity reduction processing. In conventional capacity reduction processing, rebuild processing was required since the reduction was performed after the block became unable to be read, but according to the storage unit 1 of the first embodiment, since a block close to end of life is detected, the execution of a rebuild processing is not required.

Further, since the storage media such as flash memory do not necessarily have uniform qualities, it is not possible to determine the life accurately if they determine the life based only on the erase count. Therefore, according to the SSD of the present embodiment, error characteristic information (the FM error characteristic table 1200) and life characteristic information (the FM life characteristic table 1400) of a plurality of sample FMs having different qualities which were evaluated in advance are stored in the SSD. When the SSD judges the quality of each storage area (block, physical page) in the SSD, the error characteristic (number of error bits and elapsed time after WR) of the storage area when diagnosed and the error characteristic of the sample FM are compared, so as to determine which sample FM has the quality closest to the quality of the storage area, and judges the life of the diagnosis target storage area using the life characteristic information of the determined sample FM. Thereby, even in a state where storage media (FM chips) having different qualities are mixed together in the SSD, the life can be estimated accurately.

Further, if the logical capacity of the SSD 21 is reduced, the capacity of the RAID group to which the relevant SSD belongs is also reduced. If the capacity of the RAID group is reduced, the RAID group can no longer retain the data that has existed in the reduced area. Therefore, before reducing the logical capacity of the SSD 21, the storage controller 10 determines the chunk required to be reduced from the RAID group to which the relevant SSD belong based on the logical capacity after reduction, and migrates the data of the chunk to a different RAID group. In other words, the storage controller 10 migrates the necessary amount of data for logical capacity reduction (at least the data equal to or more than the reduced logical capacity) from the SSD subjected to logical capacity reduction to the SSD of a different RAID group, to prevent data loss.

The above embodiment has illustrated an example in which if there is chunk that requires reduction (chunk no longer capable of being allocated to the virtual chunk) (S73: Yes), and if there is free space in a different RAID group (S74: Yes), all the data in the chunk required to be reduced is migrated to a different RAID group. However, in the judgment at S73, the storage controller 10 may judge whether there is a chunk allocated to a virtual chunk (chunk whose status 555 is "allocated") among the chunks required to be reduced, and may migrate only the chunk(s) allocated to the virtual chunk(s) to a different RAID group in S75.

In the example of the capacity reduction processing described above, an example has been illustrated where the reduction is done in order from the end of the logical address space of the SSD 21 when the capacity of the SSD 21 is to be reduced. Along therewith, the chunk of the RAID group to which the SSD 21 belongs turns into unavailable state (non-allocatable to the virtual chunk) in order from the chunk at the end area of the RAID group. However, the method for reducing capacity is not necessarily restricted to this example. In reducing the capacity, the arbitrary area in the logical address space of the SSD 21 can be reduced.

For example, when the SSD 21 makes a capacity reduction request, it notifies the storage controller 10 of the range of the logical address space being the target of reduction, instead of the logical capacity after reduction. The range of the logical address space notified here can be an arbitrary area. The storage controller 10 can set the chunk including the address range received from the SSD 21 to unavailable (non-allocatable to virtual chunk) and can migrate the data in the chunk as needed to a different RAID group.

As another embodiment, the storage controller 10 can determine the area to be reduced. In that case, the storage controller 10 computes the number of chunks required to be deleted based on the logical capacity after reduction notified from the SSD 21, and then determines the target of the chunk to be deleted. At this time, an arbitrary chunk can be the target of deletion, but it is preferable to select the chunk not mapped to the virtual chunk as the target of deletion. This is because it makes data migration unnecessary. After determining the delete target chunk, the storage controller 10 specifies LBA range of the SSD 21 corresponding to the delete target chunk, and notifies the LBA range to the SSD 21.

Second Embodiment

Next, a storage unit according to a second embodiment will be described. A configuration of the storage unit according to the second embodiment is the same as that described in the first embodiment. Further, a configuration of hardware of SSD according to the second embodiment is the same as that described in the first embodiment.

In the first embodiment, a method of predicting the quality of the FM chips 210 and the life (erasable number of times) by the SSD 21 has been described. However, according to the first embodiment, there may be a case where hardware-caused failure suddenly occurs to the FM chip and the data is lost. Therefore, according to the second embodiment, an example of a case where the SSD 21 uses the FM chip in a RAID configuration to cope with sudden hardware failure of the FM chip will be described.

Figure 26:
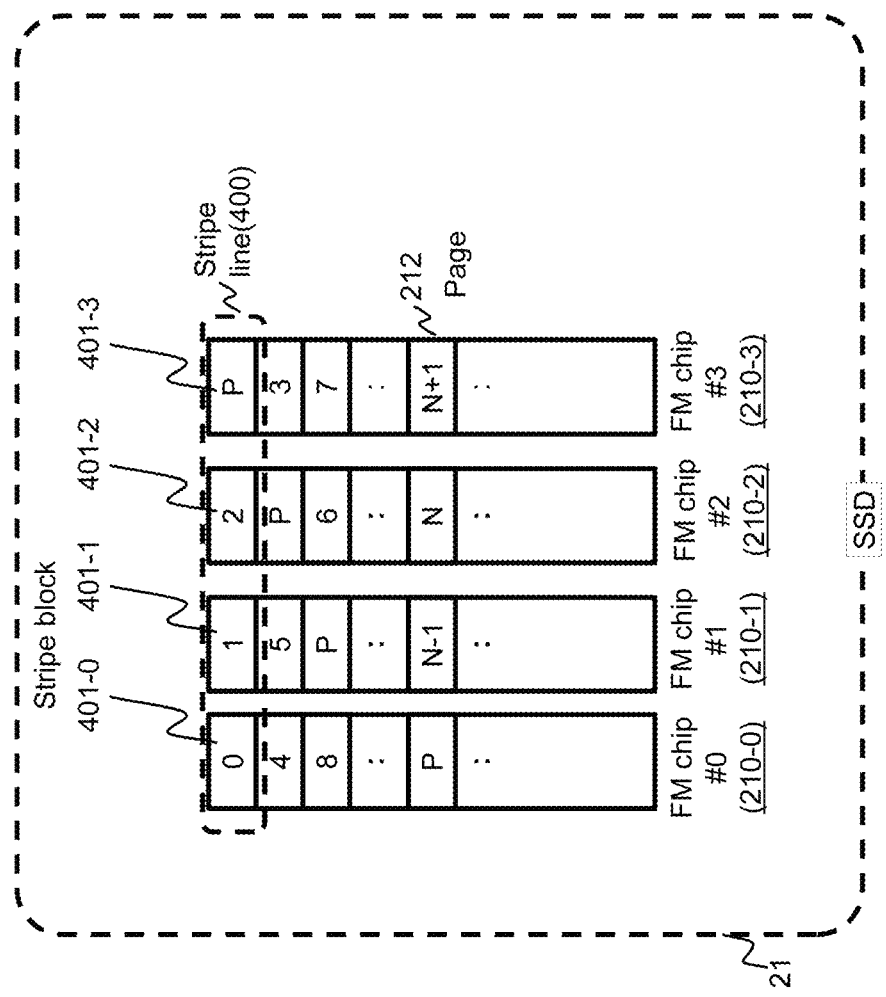
FIG. 26 is an explanatory view of data arrangement in SSD according to a second embodiment.

FIG. 26 is an explanatory view of a data arrangement in the SSD according to the second embodiment. This is equivalent to having the RAID group 30 in FIG. 5 replaced with the SSDs 21, and SSDs #0 through #3 with the FM chips #0 through #3. The FM chips #0 through #3 are storage spaces provided in the FM chips 210. Further, in FIG. 26, the size of the stripe blocks serving as a storage unit of data and parity is the same as the size of the pages 212. However, the size of each stripe block can be a multiple of the page size. Or, the size can be a multiple of the capacity of the block 211, the die 213 or the FM chip 210.

Figure 27:
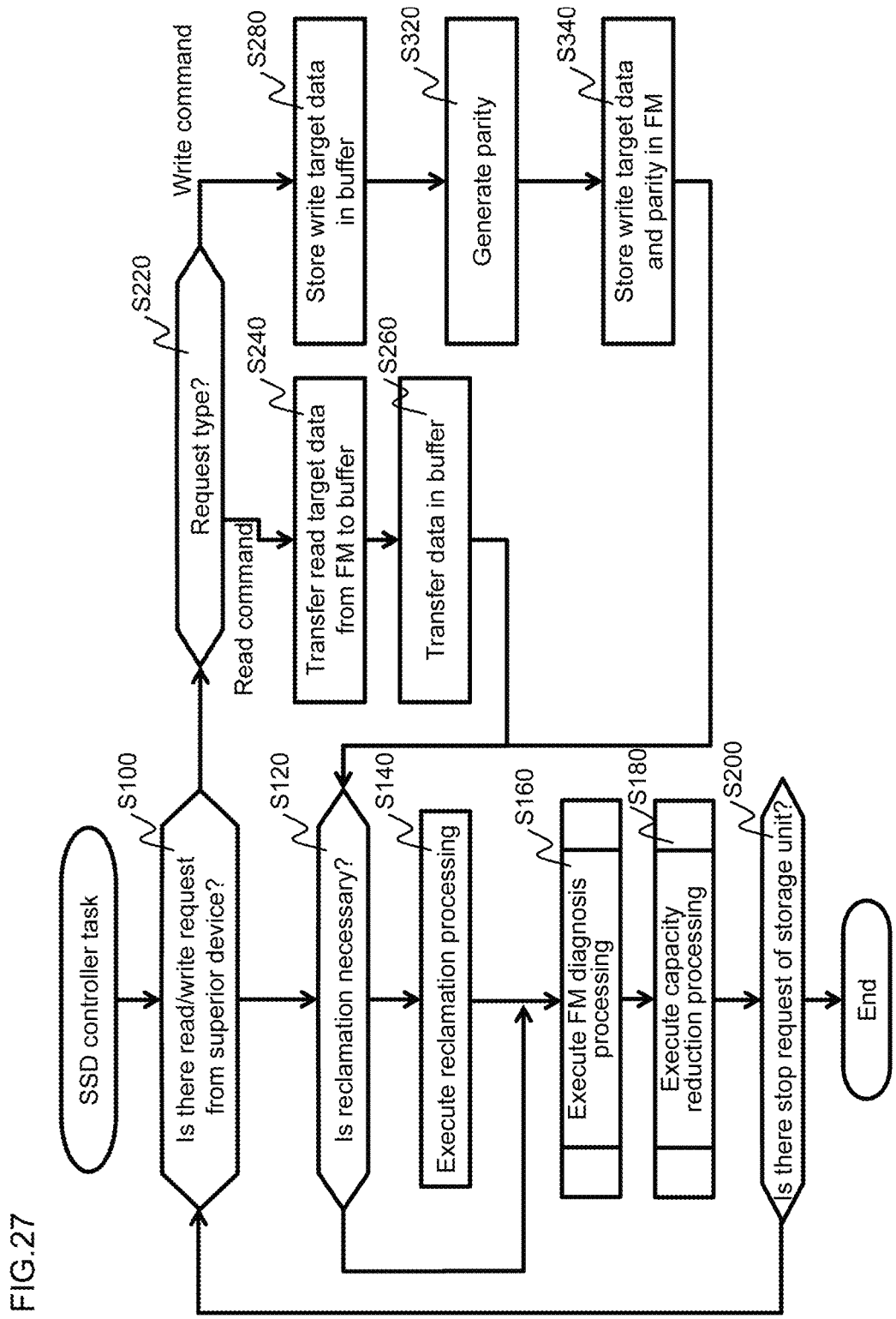
FIG. 27 is a flowchart of SSD controller task according to the second embodiment.

FIG. 27 is a flowchart of an SSD controller task according to the second embodiment. Here, only the difference with the SSD controller task (FIG. 22) according to the first embodiment will be described.

In FIGS. 27, S320 and S340 exist instead of S300. At first, in S320, the SSD controller 200 generates the parity from the write target data stored in the buffer in the processing prior to S280. The parity generation processing can be done by the parity operation circuit 206 in the SSD controller, or can be done by the CPU 201 executing a program for generating parity (S320). After executing S320, the SSD controller 200 stores the write target data and the parity created in S320 respectively to the physical page (S340). The other processes are similar to FIG. 22.

Figure 28:
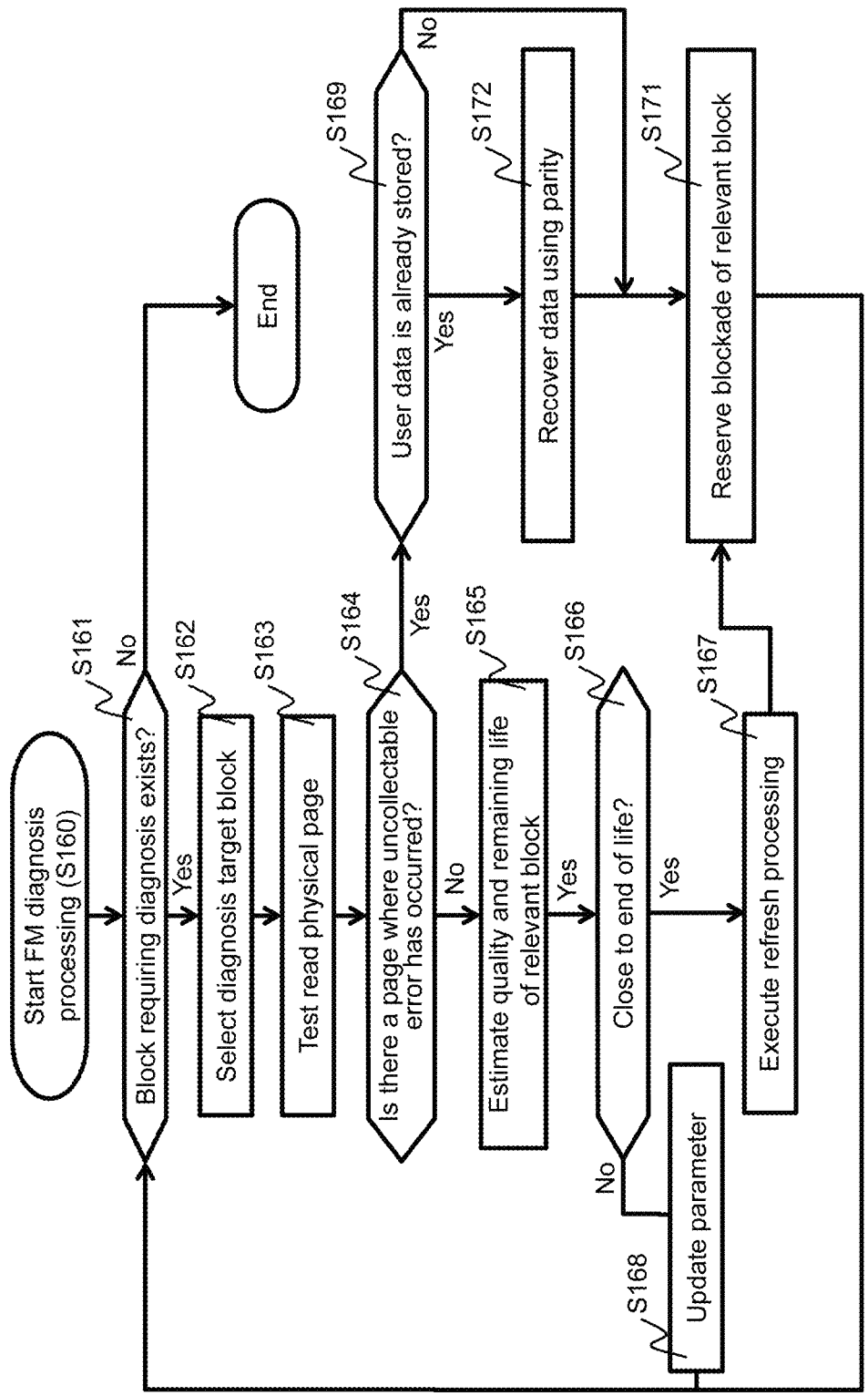
FIG. 28 is a flowchart of FM diagnosis processing according to the second embodiment.

FIG. 28 is a flowchart of an FM diagnosis processing according to the second embodiment. Here, only the difference with the FM diagnosis processing (FIG. 23) according to the first embodiment will be described.

In FIG. 28, S172 exists instead of S170 in FIG. 23. In S172, the SSD controller 200 recovers the data stored in the physical page in which uncorrectable error detected in S164 has occurred using a RAID technique (using parity) (S172). Then, the recovered data is stored in a different physical page, and the mapping of the logical page and physical page is updated (the contents of the logical-physical conversion table 1100 is updated).

The above described the difference of processing between the storage unit according to the second embodiment and the storage unit according to the first embodiment. The other points of the processing performed in the storage unit (and the SSD) according to the second embodiment are the same as those described in the first embodiment. According to the storage unit of the second embodiment, even if uncorrectable error has occurred due to a sudden failure of hardware of the FM chip, the SSD 21 can use the redundant data stored in the FM chip to recover the data. Therefore, the data retaining ability of the SSD can be improved further, and the frequency of execution of the rebuild processing in the storage controller 10 can be suppressed.

The above has described an example of recovering the data in the physical page in which uncorrectable error has occurred during the FM diagnosis processing, but the data recovery can also be performed when a read command is received from the storage controller 10. That is, when uncorrectable error has occurred during execution of S240 of FIG. 27, the SSD controller 200 can perform the processing of S172 described above.

The embodiments of the present invention have been described above, but the embodiments are mere examples for illustrating the present invention, and are not intended to limit the scope of the invention to the described embodiments. The present invention can also be realized in various other embodiments.

For example, according to the above-described embodiment, an example has been described in which the data in the chunk of the RAID group configured by the SSD is migrated to a RAID group also configured by the SSD. However, if storage devices other than SSDs, such as HDDs, are connected to the storage unit, the data in the chunk can be migrated to a RAID group configured of HDDs.

According further to the above-described embodiments, an example has been illustrated of a configuration where the SSD is installed in a storage controller, but it can also be installed in a host computer. In that case, the host computer is required to hold similar functions (such as the capacity virtualization function) as the storage controller described above.

REFERENCE SIGNS LIST

1: Storage unit, 2: host computer, 3: SAN, 5: management host, 10: storage controller, 11: CPU, 12: host I/F, 13: device I/F, 14: memory, 15: management I/F, 21: SSD, 25: HDD, 200: SSD controller, 201: CPU, 202: upstream I/F, 203: downstream I/F, 204: memory, 205: internal connection switch, 206: parity operation circuit, 210: FM chip, 211: block, 212: page, 213: die.

The invention claimed is:

1. A storage unit comprising:
    a plurality of storage devices that each include a nonvolatile storage medium and a device controller, wherein the nonvolatile storage medium includes a plurality of storage areas wherein the device controller of each respective storage device is configured to:
    analyze the plurality of storage areas in the nonvolatile storage medium of the respective storage device to identify one more advanced deterioration areas that currently store data, wherein the one or more advanced deterioration areas are particular storage areas of the nonvolatile storage medium that are close to an end of life, and for each of the one or more advanced deterioration areas identified, the respective device controller is configured to:

migrate the data in the one or more advanced deterioration areas identified to a different storage area in the respective storage device, block storage of new data in the one or more advanced deterioration areas identified, and reduce an amount of storage space provided by the respective storage device by a size corresponding to the one or more advanced deterioration areas identified.

2. The storage unit according to claim 1, wherein a total size of the respective storage areas is equivalent to a sum of a logical capacity which is the size of the storage space, and a reserve capacity, and wherein the device controller of each respective storage device is further configured to:

when the respective storage device has the reserve capacity equal to or greater than a minimum reserve capacity, reduce the reserve capacity instead of the size of the storage space.

3. The storage unit according to claim 1, wherein each of the plurality of storage devices further includes a memory that stores error characteristic information and a life characteristic information of each of the plurality of storage areas, wherein the device controller of each respective storage device is further configured to:

compare the error characteristic of each storage area with the error characteristic information for the particular storage area, and judges deterioration state of each storage area using the life characteristic information stored in the memory.

4. The storage unit according to claim 3, wherein the error characteristic information includes information related to a number of error bits that have occurred when reading the storage area, the life characteristic information includes information of an erase count based on which the storage area is to be blocked, and when the erase count of the storage area exceeds the erase count included in the life characteristic information, the respective device controller determines that the storage area is in the state close to end of life.

5. A storage system comprising:

a storage controller; and a plurality of storage devices that each include a nonvolatile storage medium and a device controller, wherein the nonvolatile storage medium includes a plurality of storage areas, wherein the device controller of each respective storage device is configured to:

analyze the plurality of storage areas in the nonvolatile storage medium of the respective storage device to identify one more advanced deterioration areas that currently store data, wherein the one or more advanced deterioration areas are particular storage areas of the nonvolatile storage medium that are close to an end of life and for each of the one or more advanced deterioration areas identified, the device controller is configured to:

migrate the data in the one or more advanced deterioration areas identified to a different storage area in the respective storage device, block storage of new data in the one or more advanced deterioration areas identified, issue a request to reduce an amount of storage space by the respective storage device to the storage controller, and on a condition that the storage controller approves the request, reduces a size of the storage space provided by the respective storage device by a size corresponding to the one or more advanced deterioration areas identified.

6. The storage system according to claim 5, wherein the storage controller is configured to:

manage a plurality of RAID groups configured using storage spaces of the plurality of storage devices, receive the request from the respective storage device, and change a capacity of a particular RAID group that includes the respective storage device based on a minimum value of available storage space of the plurality of storage devices included in the particular RAID group.

7. The storage system according to claim 6, wherein when the storage controller changes the capacity of the particular RAID group, the storage controller transmits a message stating that reduction of size of the storage space is permitted to the respective storage device.

8. The storage system according to claim 6, wherein the storage controller is configured to:

manage the storage spaces of the plurality of RAID groups by chunks, provide a virtual volume to a host computer, map a particular chunk to a corresponding virtual chunk at a point of time when a write request to the corresponding virtual chunk is received from the host computer, and store write data contained in the write request to the particular chunk that corresponds to corresponding virtual chunk, and reduce a size of the virtual volume when the size of the particular RAID group is changed.

9. A storage device comprising:

a nonvolatile storage medium including a plurality of storage areas; and a device controller, wherein the device controller is configured to:

analyze the plurality of storage areas in the nonvolatile storage medium to identify one more advanced deterioration areas that currently store data, wherein the one or more advanced deterioration areas are particular storage areas of the nonvolatile storage medium that are close to an end of life, and for each of the one or more advanced deterioration areas identified, the device controller is configured to:

migrate the data in the one or more advanced deterioration areas identified to a different storage area, block storage of new data in the one or more advanced deterioration areas identified, and reduce an amount of a storage space provided the storage device by a size corresponding to the one or more advanced deterioration areas identified.

10. The storage device according to claim 9, wherein the device controller is further configured to:

issues a reduction request to an external device to which the storage device is connected, and reduces the size of the storage space when a confirmation is received from the external device.

11. The storage device according to claim 9, wherein
a total size of the respective storage areas is equivalent to a sum of a logical capacity which is the size of the storage space, and a reserve capacity, and
when the storage device has the reserve capacity equal to or greater than a minimum reserve capacity, the reserve capacity is reduced instead of the size of the storage space.

12. The storage device according to claim 9, wherein
the storage device further includes a memory that an error characteristic information and a life characteristic information of the plurality of storage areas, and
the device controller is further configured to:
compare the error characteristic of each storage area with the plurality of error characteristic information, and
judges deterioration state of each storage area using the life characteristic information.

13. The storage device according to claim 12, wherein
the error characteristic information includes information related to a number of error bits that have occurred when reading the storage area,
the life characteristic information includes information of an erase count based on which the storage area is to be blocked, and
when the erase count of the storage area exceeds the erase count included in the life characteristic information, the device controller determines that the storage area is in the state close to end of life.

\* \* \* \* \*